United States Patent
Ogata

(10) Patent No.: US 6,553,073 B1
(45) Date of Patent: Apr. 22, 2003

(54) SENDING DEVICE, RECEIVING DEVICE, SENDING-RECEIVING DEVICE, TRANSMITTER, AND TRANSMITTING METHOD

(75) Inventor: Ichiro Ogata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/077,429

(22) PCT Filed: Sep. 26, 1997

(86) PCT No.: PCT/JP97/03448

§ 371 (c)(1),
(2), (4) Date: Dec. 30, 1998

(87) PCT Pub. No.: WO98/15121

PCT Pub. Date: Apr. 9, 1998

(30) Foreign Application Priority Data

Sep. 30, 1996 (JP) .............................................. 8-259495

(51) Int. Cl.⁷ .............................. H04N 7/08; H04N 7/12
(52) U.S. Cl. ................................................. 375/240.28
(58) Field of Search ....................... 348/240.18, 240.25, 348/240.27, 240.28, 705; 370/464, 466, 467, 468, 470, 472, 473, 479; H04N 7/08, 7/12

(56) References Cited

U.S. PATENT DOCUMENTS

| | | | |
|---|---|---|---|
| 5,199,030 A | * 3/1993 | Ueda | 386/96 |
| 5,381,181 A | 1/1995 | Deiss | |
| 5,523,795 A | 6/1996 | Ueda | |
| 5,600,366 A | * 2/1997 | Schulman | 725/36 |
| 5,691,777 A | * 11/1997 | Kassatly | 375/240.18 |
| 5,724,091 A | * 3/1998 | Freeman et al. | 725/128 |

FOREIGN PATENT DOCUMENTS

| | | |
|---|---|---|
| EP | 0624982 A2 | 11/1994 |
| EP | 0641131 A2 | 3/1995 |
| JP | 4-330885 | 11/1992 |
| JP | 5-176307 | 7/1993 |
| JP | 5-227516 | 9/1993 |
| JP | 7-46591 | 2/1995 |
| JP | 7-67087 | 3/1995 |
| JP | 7-147689 | 6/1995 |
| JP | 8-205104 | 8/1996 |

* cited by examiner

*Primary Examiner*—Nhon Diep
(74) *Attorney, Agent, or Firm*—Frommer Lawrence & Haug LLP; William S. Frommer; Bruno Polito

(57) ABSTRACT

An object of the present invention is to provide a sending device, a receiving device, and a sending/receiving device which make it possible to easily implement a two-channel compressed moving picture transmission system by using an existing single-channel compressed moving picture transmission system. The sending device includes transmission systems corresponding to two channels including video bit rate reduction encoders 2 and 6 for compressing picture data, and SDDI encoders 4 and 8 for generating predetermined serial signal data from compressed picture data, and a data selector 9 for conducting changeover between serial signal data of channel 1 output from the transmission system of the channel 1 and serial signal data of channel 2 output from the transmission system of the channel 2 on the basis of a reference frame signal RF.

22 Claims, 20 Drawing Sheets

FIG. 12

Line number

| | 1 | 2 |
|---|---|---|
| B9 | $\overline{EP1}$ | $\overline{EP2}$ |
| B8 | EP1 | EP2 |
| B7 | L7 | R5 |
| B6 | L7 | R4 |
| B5 | L7 | R3 |
| B4 | L7 | R2 |
| B3 | L7 | R1 |
| B2 | L2 | R0 |
| B1 | L1 | L9 |
| B0 | L0 | L8 |

FIG. 13

Line number CRC

|  | 1 | 2 |
|---|---|---|
| B9 | $\overline{C8}$ | $\overline{C17}$ |
| B8 | C8 | C17 |
| B7 | C7 | C16 |
| B6 | C6 | C15 |
| B5 | C5 | C14 |
| B4 | C4 | C13 |
| B3 | C3 | C12 |
| B2 | C2 | C11 |
| B1 | C1 | C10 |
| B0 | C0 | C9 |

FIG. 16

User data

| $\overline{B8}$ | $\overline{B8}$ | $\overline{B8}$ | | | $\overline{B8}$ | $\overline{B8}$ | $\overline{B8}$ |
|---|---|---|---|---|---|---|---|
| B8 | B8 | B8 | | | B8 | B8 | B8 |
| | | | | | | | |
| | | | | | | | |
| | | | | | | | |
| | | | | | | | |
| | | | | | | | |
| | | | | | | | |
| B1 | B1 | B1 | | | B1 | B1 | B1 |
| B0 | B0 | B0 | | | B0 | B0 | B0 |

FIG. 19

Wordcount

| | 1 | 2 | 3 | 4 |
|---|---|---|---|---|
| B9 | $\overline{EP1}$ | $\overline{EP2}$ | $\overline{EP3}$ | $\overline{EP4}$ |
| B8 | EP1 | EP2 | EP3 | EP4 |
| B7 | C7 | C15 | C23 | C31 |
| B6 | C6 | C14 | C22 | C30 |
| B5 | C5 | C13 | C21 | C29 |
| B4 | C4 | C12 | C20 | C28 |
| B3 | C3 | C11 | C19 | C27 |
| B2 | C2 | C10 | C18 | C26 |
| B1 | C1 | C9 | C17 | C25 |
| B0 | C0 | C8 | C16 | C24 |

FIG. 20

| SYNCHRONIZING WORD | | 3FF | 000 | 000 | XYZ | MEANING OF LETTERS XYZ |
|---|---|---|---|---|---|---|
| WORD ADDRESS | EAV | 1440 | 1441 | 1442 | 1443 | |
| | SAV | 1712 | 1713 | 1714 | 1715 | |
| B9(MSB) | | 1 | 0 | 0 | 1 | FIXED AND ALWAYS KEPT EQUAL TO 1 |
| B8 | | 1 | 0 | 0 | F | 0 : FIRST FIELD<br>1 : SECOND FIELD |
| B7 | | 1 | 0 | 0 | V | 0 : VALID PICTURE INTERVAL<br>1 : VERTICAL BLANKING INTERVAL |
| B6 | | 1 | 0 | 0 | H | 0 : AT THE TIME OF SAV<br>1 : AT THE TIME OF EAV |
| B5 | | 1 | 0 | 0 | P3 | ADDITIONAL BIT FOR ERROR CORRECTION WITH RESPECT TO F, V AND H |
| B4 | | 1 | 0 | 0 | P2 | |
| B3 | | 1 | 0 | 0 | P1 | |
| B2 | | 1 | 0 | 0 | P0 | |
| B1 | | 1 | 0 | 0 | 0 | FIXED AND ALWAYS KEPT EQUAL TO 0 |
| B0(LSB) | | 1 | 0 | 0 | 0 | |

90 Timing Reference Signal
91 XYZ
92 REFERENCE FRAME SIGNAL

SENDING DEVICE, RECEIVING DEVICE, SENDING-RECEIVING DEVICE, TRANSMITTER, AND TRANSMITTING METHOD

TECHNICAL FIELD

The present invention relates to a technique for transmitting compressed moving picture data of a plurality of channels by using a serial transmission path of a single channel including a light, a radio wave and so on. The present invention is suitable for use in, for example, a video server system.

BACKGROUND ART

Conventionally, the waveform of an analog composite signal was examined by using an oscilloscope, and its rising time and frequency characteristics, for example, were measured. Then, it was determined whether desired characteristics were achieved. When this analog signal was subjected to transmission or the like, its waveform itself was thus handled so as to be able to reproduce a waveform close to the original one with as little degradation as possible.

By sampling and quantizing such an analog signal to convert it into a digital form, the signal could be handled simply as digits no matter whether the signal was recorded or transmitted. Therefore, occurrence of degradation was prevented by preventing mistakes in digits.

When in this case an electric signal was converted into a digital form and handled as digits (data), for example, sampled data of bits were often connected between two devices via a cable so as to make bits parallel and data were transmitted. Such a scheme was called a parallel interface or a parallel transmission. In an 8 bit system, eight different signals were sent simultaneously from a device on a sending side to a device on a receiving side at this time. For signals sent in parallel, a parallel clock to be used for shaping when transmitting data was sent on a ninth signal path together with the data. There was thus used such a configuration that the timing of reproducing data in the device on the receiving side was always kept correct and sent data could be reproduced without errors.

In such a parallel interface, data were grouped into a block (packet) form beforehand in order to send the data efficiently and a signal corresponding to block synchronizing was added to each block prior and then transmitted. In the scheme using the block synchronizing, a part of data required to be actually sent is first defined, and a reference signal specifying its position was inserted.

In the parallel interface, a parallel clock was transmitted between devices apart from the data as described above. On the other hand, in a serial interface, only data are transmitted successively by using one cable. In the serial interface, however, mutual conversion can be facilitated by utilizing conventions of the parallel interface to the utmost. As one satisfying such a condition, an SMPTE (Society of Motion Picture and Television Engineers) 259M was standardized. Such a serial interface prescribes a procedure for making data serial and sending the serial data and a procedure for making the data parallel again. In this way, it has become possible to conduct a long distance transmission over one cable which was impossible in the conventional parallel interface.

As against an SDI (Serial Digital Interface) scheme standardized in the SMPTE 259M, there was an SDDI (Serial Digital Data Interface) scheme individually developed by the applicant of the present invention. Though the SDDI scheme is suitable for multimedia and multichannel application, it has a high compatibility with the SDI scheme.

In a system hereafter described, picture data formatted in accordance with the SDI scheme is compressed and then converted into the format of the SDDI scheme, and compressed moving picture data of a single channel is transmitted over a transmission path of the SDDI scheme. First of all, the configuration of a transmitting device will now be described. In FIG. 1, the transmitting apparatus includes an SDI decoder 100 for restoring original digital data from moving picture data V formatted in the SDI scheme, a video bit rate reduction encoder 101 for compressing the digital data to approximately ⅛, and an SDDI payload memory 102 for conducting preprocessing to convert the compressed moving picture data, audio data A formatted in the AES/EBU scheme and control data C to a format of the SDDI scheme at the time of writing.

Furthermore, the sending device includes an SDDI encoder 103 for adding a header portion and the like containing a synchronizing signal to payload data on the basis of a predetermined reference signal RF and generating data of the format of the SDDI scheme, and a serial interface transmitter 104 for serially transmitting the data of the format of the SDDI scheme as output data OD.

Here, the control data C is control data concerning the control of the moving picture data V and the audio data A. In the format of the SDDI scheme, the payload is a portion storing user data.

The transmitting apparatus having such a configuration conducts operation as hereafter described. When the moving picture data V formatted according to the SDI scheme is supplied to the SDI decoder 100, the moving picture data V is processed in the SDI decoder 100 so as to restore the original digital data represented by video data 113 in FIG. 3C. The restored original digital data is supplied to the video bit rate reduction encoder 101. In the video bit rate reduction encoder 101, the digital data is compressed in such a manner that four fields shown by the reference frame signal RF in FIG. 3A are compressed to approximately ⅛. A resultant compressed state is shown in FIG. 3B. This compressed moving picture data, the audio data A denoted by 114 in FIG. 3C, and the control data C denoted by 112 in FIG. 3C are supplied to the SDDI payload memory 102. At the time of writing into the SDDI payload memory 102, the compressed moving picture data, the audio data A, and the control data C are stored for the payload in the state as shown in FIG. 3B.

The data stored for the payload is supplied to the SDDI encoder 103. In the SDDI encoder 103, the header portion and the like containing the synchronizing signal which is not illustrated are added to the payload data at every four fields on the basis of the reference frame signal RF shown in FIG. 3A, so that data 110 having the format of the SDDI scheme is generated as shown in FIG. 3B. The data 110 of the format of the SDDI scheme is supplied to the serial interface transmitter 104. In the serial interface transmitter 104, the output data OD having the format of the SDDI scheme as shown in FIG. 3B is serially transmitted as the data 110 at every four fields represented by the reference frame signal RF in FIG. 3A. In the same way, data is generated in the next four fields.

The configuration of a receiving apparatus will now be described. As shown in FIG. 2, the receiving device includes a serial interface receiver 105 for receiving the output data OD having the format of the SDDI scheme as shown in FIG.

3B, an SDDI decoder 106 for restoring the original digital data from the output data OD having the format of the SDDI scheme, and an SDDI payload memory 107 for storing the restored original digital data and dividing the restored original digital data into the compressed moving picture data, the audio data A, and the control data C at the time of reading.

Furthermore, the receiving apparatus includes a video bit rate reduction decoder 108 for conducting expansion processing on the compressed moving picture data, and an SDI encoder 109 for converting the moving picture data subjected to the expansion processing to the format of the SDI scheme and outputting the original moving picture data V.

The receiving apparatus having such a configuration conducts operation heretofore described. The output data OD of the format of the SDDI scheme is supplied to the serial interface receiver 105. In the serial interface receiver 105, the output data OD of the format of the SDDI scheme is received. The received output data OD of the format of the SDDI scheme is supplied to the SDDI decoder 106. In the SDDI decoder 106, the original digital data is restored from the output data OD of the format of the SDDI scheme. The restored original digital data is supplied to the SDDI payload memory 107. In the SDDI payload memory 107, the original digital data is stored. At the time of reading, the original digital is divided to the compressed moving picture data, the audio data A, and the control data C.

The compressed moving picture data obtained by the division is supplied to the video bit rate reduction decoder 108. In the video bit rate reduction decoder 108, the compressed moving picture data is subjected to the expansion processing. The original moving picture data subjected to the expansion processing is supplied to the SDI encoder 109. In the SDI encoder 109, the moving picture data is converted to the format of the SDI scheme and output as the original moving picture data V. The audio data A and the control data C obtained by the division are output as they are.

In this way, it is possible to convert the moving picture data A of a single channel of the SDI scheme to the compressed moving picture data and transmit the compressed moving picture data together with the audio data A and the control data C as the output data OD of the format of the SDDI scheme via the SDDI transmission path.

PROBLEMS THAT THIS INVENTION IS TO SOLVE

In the case where a compressed moving picture transmission system of two or more channels is formed by using such a single-channel compressed moving picture transmission system using a conventional SDDI transmission path, however, it is indispensable in the device of the sending side to provide a function of disposing data of channels in an arbitrary place of a data area of the SDDI format so that they may not overlap each other in order to be able to flexibly cope with a change in the number of respective channels to be transmitted and a change in data size of respective channels. Furthermore, it is indispensable in the receiving apparatus to provide a function of correctly extracting data of respective channels disposed in the arbitrary place of the data area of the SDDI format.

Furthermore, for implementing such a function in the sending device and the receiving device, in the sending device, for example, the operation for writing data to be sent onto the SDDI format into the internal SDDI payload memory beforehand and making preparation becomes complicated. This results in a disadvantage that the circuit configuration differs largely from that of the sending device of compressed moving picture transmission of a single channel and becomes a large scale.

When it is attempted to implement compressed moving picture transmission limited to two channels by using such a single-channel compressed moving picture transmission system using a conventional SDDI transmission path, therefore, the device has a configuration largely exceeding the scale of two single-channel compressed moving picture transmission systems. In addition, there occurs a disadvantage that the configuration of the single-channel compressed moving picture transmission system cannot be diverted as it is.

DISCLOSURE OF INVENTION

The present invention has been made in view of such problems. An object of the present invention is to provide a sending device, a receiving device, and a sending/receiving device capable of implementing a two-channel compressed moving picture transmission system by using the existing single-channel compressed moving picture transmission system with ease.

MEANS FOR SOLVING THE PROBLEMS

The sending device of the present invention is a sending device including a plurality of sending systems, each of the sending systems including compression means for compressing picture data, and serial signal generation means for adding a predetermined synchronizing signal to compressed picture data compressed by the compression means and thereby generating predetermined serial signal data, serial signal data of a plurality of channels being sent from the plurality of sending systems, in which there is provided a changeover means for changing over between the serial signal data of a certain channel output from the serial signal generation means of the sending systems and serial signal data of another channel output from the serial signal generation means of another sending system included in the plurality of sending systems, according to a changeover signal based upon the synchronizing signal, and the serial signal data of the certain channel and the serial signal data of the another channel are serially transmitted according to the changeover signal.

A receiving device of the present invention is a receiving device including a plurality of receiving systems, each of the receiving systems including serial signal detection means for detecting compressed picture data and a predetermined synchronizing signal from serial signal data obtained by adding the predetermined synchronizing signal to the compressed picture data, and expansion means for expanding the compressed picture data detected by the serial signal detection means and thereby restoring original picture data, serial signal data of a plurality of channels being received and the original picture data of the plurality of channels being output from the plurality of receiving systems, in which there is provided a changeover means for outputting the compressed picture data output from the serial signal detection means to the receiving system of a certain channel and another receiving system of another channel included in the plurality of receiving systems changed over according to a changeover signal based upon the synchronizing signal, and changeover between the compressed picture data of the certain channel and the compressed picture data of the another receiving system is conducted according to the changeover signal, and thereby original picture data of the certain channel and original picture data of the another channel are output from the receiving system and the another receiving system.

A sending/receiving device of the present invention is a sending/receiving device including a sending unit and a receiving unit, the sending unit including a plurality of sending systems, each of the sending systems including compression means for compressing picture data, and serial signal generation means for adding a predetermined synchronizing signal to compressed picture data compressed by the compression means and thereby generating predetermined serial signal data, serial signal data of a plurality of channels being sent from the plurality of sending systems, the receiving unit including a plurality of receiving systems, each of the receiving systems including serial signal detection means for detecting the compressed picture data and the synchronizing signal from the serial signal data, and expansion means for expanding the compressed picture data detected by the serial signal detection means and thereby restoring original picture data, serial signal data of a plurality of channels being received and the original picture data of the plurality of channels being output from the plurality of receiving systems, in which in the sending unit, there is provided a changeover means for changing over between the serial signal data of a certain channel output from the serial signal generation means of the sending systems and serial signal data of another channel output from the serial signal generation means of another sending system included in the plurality of sending systems, according to a changeover signal based upon the synchronizing signal, and the serial signal data of the certain channel and the serial signal data of the another channel are serially transmitted according to the changeover signal, and in the receiving unit, there is provided a changeover means for outputting the compressed picture data output from the serial signal detection means to the receiving system of a certain channel and another receiving system of another channel included in the plurality of receiving systems changed over according to a changeover signal based upon the synchronizing signal, and changeover between the compressed picture data of the certain channel and the compressed picture data of the another channel is conducted according to the changeover signal, and thereby original picture data of the certain channel and original picture data of the another channel are output from the receiving system and the another receiving system.

Furthermore, a transmission device of the present invention is a transmission device for transmitting video data of a plurality of channels, in which there are provided compression means for compressing video data of a first channel and video data of a second channel and thereby generating first compressed video data and second compressed video data, conversion means for converting the first compressed video data and the second compressed video data to a predetermined serial transmission format, and transmission control means for controlling transmission timing of the first converted compressed video data and the second converted compressed video data such that the first compressed video data and the second compressed video data converted to the predetermined transmission format by the conversion means are transmitted by using one serial transmission system.

Furthermore, a transmission device of the present invention is a transmission device for transmitting video data of a plurality of channels, there are provided compression means for compressing video data of a first channel and video data of a second channel each having a predetermined interval length and thereby generating first compressed video data and second compressed video data, and transmission means for multiplexing and transmitting the first compressed video data and the second compressed video data such that the first compressed video data and the second compressed video data are transmitted in the predetermined interval by using one serial transmission system.

Furthermore, a transmission method of the present invention is a transmission method for transmitting video data of a plurality of channels, in which video data of a first channel and video data of a second channel are compressed thereby generating first compressed video data and second compressed video data, the first compressed video data and the second compressed video data are converted to a predetermined serial transmission format, and transmission timing of the first converted compressed video data and the second converted compressed video data is controlled such that the first converted compressed video data and the second compressed video data and the second converted compressed video converted to the predetermined format are transmitted by using one serial transmission system.

Furthermore, a transmission method of the present invention is a transmission method for transmitting video data of a plurality of channels, in which video data of a first channel and video data of a second channel each having a predetermined interval length are compressed thereby generating first compressed video data and second compressed video data, and the first compressed video data and the second compressed video data are multiplexed and transmitted the first compressed video data and the second compressed video data are transmitted within the predetermined interval by using one serial transmission system.

The transmitting apparatus of the present invention operates as heretofore described.

In the first channel transmitting system, picture data of the first channel is supplied to the compression means. In the compression means, picture data corresponding to four fields is compressed to approximately ⅛. This compressed picture data is supplied to the serial signal generation means. In the serial signal generation means, a header part and the like including the synchronizing signal are added to the compressed picture data of the first channel in the field 1 at every four fields on the basis of the changeover signal and thereby serial signal data of the first channel is generated.

Furthermore, in the second channel sending system, picture data of the second channel is supplied to the compression means. In the compression means, picture data corresponding to four fields is compressed to approximately ⅛. This compressed picture data is supplied to the serial signal generation means. In the serial signal generation means, a header part and the like including the synchronizing signal are added to the compressed picture data of the second channel in the field 2 at every four fields on the basis of the changeover signal and thereby serial signal data of the second channel is generated.

Furthermore, the serial signal data of the first channel generated in the serial signal generation means of the first channel is supplied to one of the stationary contacts of the changeover means. The serial signal data of the second channel generated in the serial signal generation means of the second channel is supplied to the other of the stationary contacts of the changeover means. Here, the changeover means is supplied with the changeover signal, so that on the basis of the changeover signal, the movable contact of the changeover means is selectively connected to one or the other of the stationary contacts according to the distinction of the field 1 or the field 2 at every four fields.

In association with the field 1 or the field 2 at every four fields, therefore, the serial signal data of the first channel or the serial signal data of the second channel is selectively output from the movable contact of the changeover means at changed timing.

The serial signal data of the first channel or the serial signal data of the second channel thus output selectively at changed timing by the changeover means and the changeover signal so as to correspond to the field 1 or the field 2 at every four fields is serially transmitted as the serial signal data of the first channel or the serial signal data of the second channel at every four fields indicated by the changeover signal.

The receiving device of the present invention operates as heretofore described.

The serial signal data is supplied to the serial signal detection means. The serial signal detection means is supplied with the changeover signal, so that in the serial signal detection means, the original compressed picture data of the first channel and the second channel are restored from the serial signal data so as to correspond to the interval of the field 1 or field 2 at every four fields of the changeover signal.

In other words, the serial signal detection means detects the clock from the data string, detects the synchronizing signal such as the synchronizing word or the like and data, conducts channel decoding for data transmission, and restores scrambled data to their original arrangement. It is prescribed that the restored data string should be sent in the order beginning with the LSB and ending with the MSB. Therefore, operation of attaining synchronization and determining where on the data the LSB is located is conducted.

In this case, the clock is detected by taking a change point of the data string as the reference. When the synchronizing word has been detected, an immediately succeeding bit is judged to be the LSB. By taking the LSB as the reference, word synchronizing is attained. Once this word synchronizing is detected, bits are counted thereafter.

The original compressed picture data of the first channel and the second channel restored are supplied to one movable contact of the changeover means. The control terminal of the changeover means is supplied with the changeover signal. On the basis of the changeover signal, therefore, the other movable contact of the changeover means is selectively connected to one stationary contact or the other stationary contact according to the distinction of the field 1 or the field 2 at every four fields.

In association with the field 1 or the field 2 at every four fields, therefore, the original compressed picture data of the first channel or the original compressed picture data of the second channel is selectively output from one stationary contact or the other stationary contact of the changeover means at changed timing.

In the receiving system of the first channel, the original compressed picture data of the first channel is supplied to the expansion means. In the expansion means, the compressed moving picture data is subjected to expansion processing. The original moving picture data subjected to the expansion processing is output as the moving picture data of the first channel.

In the receiving system of the second channel, the original compressed picture data of the second channel is supplied to the expansion means. In the expansion means, the compressed moving picture data is subjected to expansion processing. The original moving picture data subjected to the expansion processing is output as the moving picture data of the second channel.

In this way, the conventional single-channel compressed moving picture transmission system is diverted to arrange compressed moving picture data of two channels at timing of the interval of the field 1 or the field 2 at every four fields, whereby the compressed moving picture data of the two channels can be serially transmitted by using one coaxial cable.

The sending/receiving device, the transmission device, and the transmission method of the present invention operates as heretofore described.

Picture data of the first channel is supplied to the transmitting system of the transmitting unit for the first channel. Picture data of the second channel is supplied to the sending system of the sending unit for the second channel. In the sending system for the first channel and the sending system for the second channel, the picture data of the first channel and the picture data of the second channel are subjected to compression processing. The moving picture data of the first channel and the moving picture data of the second channel subjected to the compression processing are converted to serial signal data at changed timing so as to be serially arranged and serially transmitted via one coaxial cable.

Upon receiving in the receiving unit the serial signal data transmitted from the sending unit, the serially arranged data are separated into the first channel and the second channel. The picture data of the first channel and the picture data of the second channel subjected to the compression processing in the first channel sending system and the second channel sending system of the sending unit are subjected to expansion processing. The picture data of the first channel and the picture data of the second channel subjected to the expansion processing are output as the original picture data of the first channel and the original picture data of the second channel.

BRIEF DESCRIPTION OF DRAWINGS

FIG. 3 is a timing chart showing data arrangement on the SDDI at the time of transmission of a conventional single-channel compressed moving picture, in which FIG. 3A is a diagram showing a reference frame signal RF, FIG. 3B is a diagram showing output data OD on the SDDI, and FIG. 3C is a diagram showing contents of the output data OD of FIG. 3B.

FIG. 6 is a timing chart showing data arrangement on the SDDI at the time of transmission of two-channel compressed moving picture of an embodiment of a sending device according to the present invention, in which FIG. 6A is a diagram showing a reference frame signal RF, FIG. 6B is a diagram showing output data OD on the SDDI, and FIG. 6C is a diagram showing contents of the output data OD of FIG. 6B.

FIG. 12 is a diagram showing line numbers of a SDDI of an embodiment of a sending device according to the present invention.

FIG. 13 is a diagram showing line number CRCs of a SDDI of an embodiment of a sending device according to the present invention.

FIG. 16 is a diagram showing user data of a SDDI of an embodiment of a sending device according to the present invention.

FIG. 19 is a diagram showing a word count of a SDDI of an embodiment of a sending device according to the present invention.

FIG. 20 is a diagram showing a reference frame signal of a SDDI of an embodiment of a sending device according to the present invention.

BEST MODE FOR CARRYING OUT THE INVENTION

Hereafter, the present embodiment will be described.

First of all, the transmission form of a two-channel compressed moving picture transmission system using a sending device and a receiving device of the present embodiment will now be described by referring to FIGS. 8 and 9.

By referring to FIG. 8, the configuration of the transmission form of a two-channel compressed moving picture transmission system in the case of SDDI direct coupling of the present embodiment will now be described. In FIG. 8, this two-channel compressed moving picture transmission system includes a sending device 30 for converting moving picture data of the SDI format of a plurality of channels supplied from a data supply source which is not illustrated to the SDDI format and sending the moving picture data in the SDDI format, a SDDI coaxial cable 31 for transmitting output data of the SDDI format, and a receiving device 32 for receiving the output data of the SDDI format and inversely converting the moving picture data of the SDDI format to the moving picture data of the SDI format to restore the original moving picture data of the SDI format supplied from the data supply source.

In this example, data supplied from the signal supply source which is not illustrated includes moving picture data V1 and audio data A1 of a first channel and moving picture data V2 and audio data A2 of a second channel. The moving picture data V1 and the moving picture data V2 are moving picture data of the SDI format. The audio data A1 and the audio data A2 are audio data of the AES/EBU format.

Figure 1:
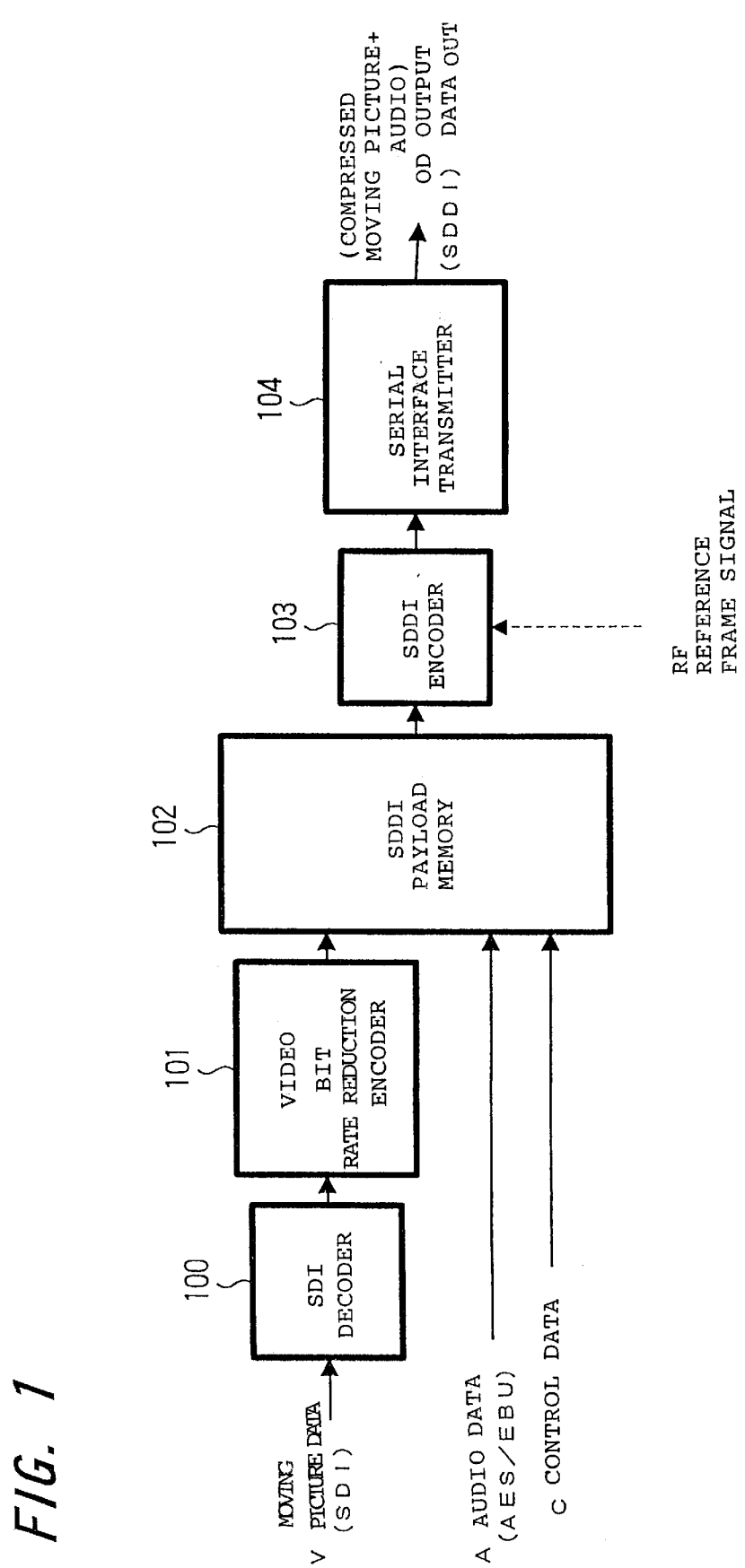
FIG. 1 is a block diagram showing the configuration of a sending device of a single-channel compressed moving picture transmission system using a conventional SDDI transmission path.

In the transmitting device 30, a transmitting device corresponding to two channels is formed by diverting the sending device of the conventional single-channel compressed moving picture transmission system using the SDDI transmission path shown in FIG. 1. Furthermore, the sending device 30 has a function of conducting compression processing on the moving picture data V1 and the moving picture data V2 of the SDI format, converting the audio data A1 and the audio data A2 and the moving picture data V1 and the moving picture data V2 subjected to the compression processing to the SDDI format, converting the data to output data so as to arrange the output data on the SDDI format, and sending the output data. The SDDI coaxial cable 31 is formed by, for example, a BNC cable.

Figure 2:
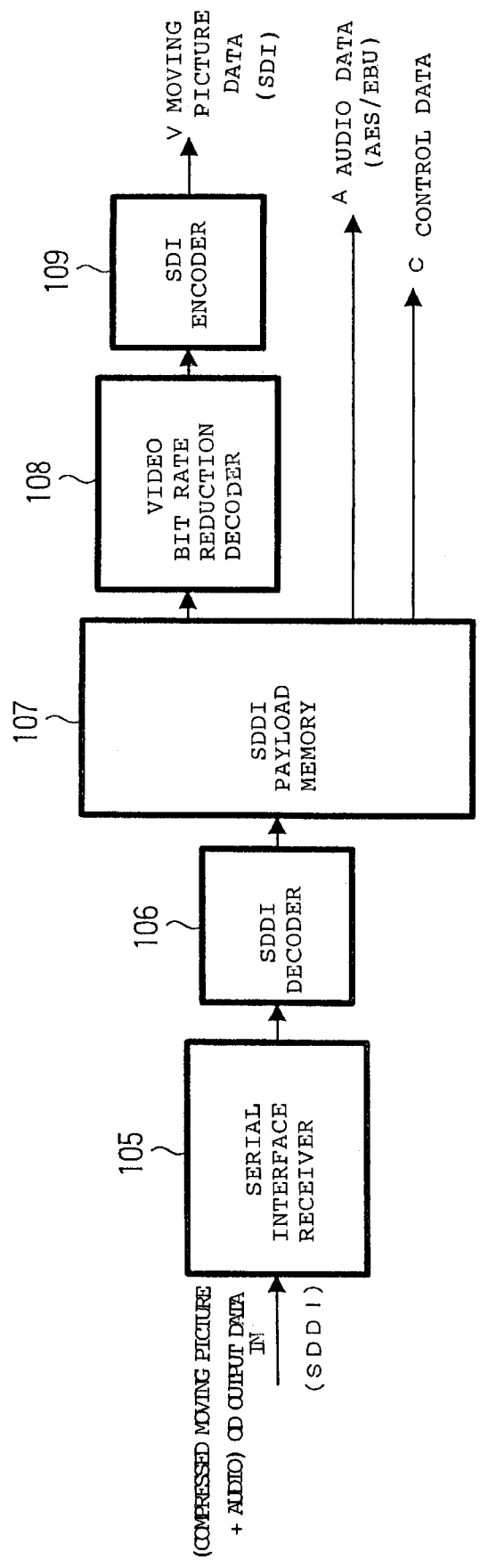
FIG. 2 is a block diagram showing the configuration of a receiving device of a single-channel compressed moving picture transmission system using a conventional SDDI transmission path.

As for the receiving device 32, a receiving device corresponding to two channels is formed by diverting the receiving device of the conventional single-channel compressed moving picture transmission system using the SDDI transmission path shown in FIG. 2. The receiving device 32 has a function of receiving the output data of the SDDI format transmitted from the sending device 30, separating output data arranged on the SDDI format, conducting expansion processing on the moving picture data V1 and the moving picture data V2 subjected to compression processing, inversely converting the moving picture data V1 and the moving picture data V2 subjected to the expansion processing to the SDI format and outputting the original moving picture data V1 of the SDI format and audio data A1 of the AES/EBU format of the first channel and the original moving picture data V2 of the SDI format and audio data A2 of the AES/EBU format of the second channel.

According to such a two-channel compressed moving picture transmission system in the case of SDDI direct coupling, operation as hereafter described is conducted. The moving picture data V1 and the audio data A1 of the first channel are supplied to the sending device 30 of the compressed moving picture transmission system for the first channel. The moving picture data V2 and the audio data A2 of the second channel are supplied to the sending device 30 of the compressed moving picture transmission system for the second channel. In the sending device 30 of the compressed moving picture transmission system for the first channel and the sending device 30 of the compressed moving picture transmission system for the second channel, the moving picture data V1 and the moving picture data V2 of the SDI format are subjected to compression processing, and the audio data A1 and the audio data A2 and the moving picture data V1 and the moving picture data V2 subjected to the compression processing are converted to output data so as to be arranged on the SDDI format and sent serially via one SDDI coaxial cable 31.

Upon receiving in the receiving device 32 the output data of the SDDI format sent from the sending device 30, the output data arranged on the SDDI format is separated into the first channel and the second channel, and furthermore separated into the compressed moving picture data V1 and the audio data A1 of the first channel and the compressed moving picture data V2 and the audio data A2 of the second channel. In the sending device 30 of the compressed moving picture data transmission system for the first channel and the sending device 30 of the compressed moving picture data transmission system for the second channel, the moving picture data V1 and the moving picture data V2 subjected to the compression processing are subjected to expansion processing, and the moving picture data V1 and the moving picture data V2 subjected to the expansion processing are converted inversely to the SDI format. Thus the original moving picture data V1 of the SDI format and audio data A1 of the AES/EBU format of the first channel and the original moving picture data V2 of the SDI format and audio data A2 of the AES/EBU format of the second channel are output.

Thus, by diverting the conventional single-channel compressed moving picture transmission system and arranging compressed moving picture data of two channels on the SDDI format at a predetermined timing, the compressed moving picture data of the two channels can be transmitted over a comparatively short distance by using the SDDI coaxial cable 31.

By referring to FIG. 9, the configuration of a transmission form of a two-channel compressed moving picture transmission system in the case of relay using a satellite channel and a high speed telephone line in the present embodiment will now be described. In FIG. 9, this two-channel compressed moving picture transmission system includes a sending device 30 for converting-moving picture data of the SDI format of a plurality of channels supplied from a data supply source which is not illustrated to the SDDI format and sending the moving picture data in the SDDI format, a SDDI coaxial cable 31 for transmitting output data of the SDDI format, a SDDI protocol conversion device 33 for converting a transmission protocol of the moving picture data of the SDDI format to a transmission protocol for a satellite circuit 34 or a high speed telephone circuit 35, the satellite circuit 34 or the high speed telephone circuit 35, a SDDI protocol inverse conversion device 36 for converting the transmission protocol for the satellite line 34 or the high speed telephone line 35 to the transmission protocol of the moving picture data of the SDDI format, and a receiving device 32 for receiving the output data of the SDDI format and converting the moving picture data of the SDDI format to the moving picture data of the SDI format inversely to restore the original moving picture data of the SDI format supplied from the data supply source.

Figure 8:
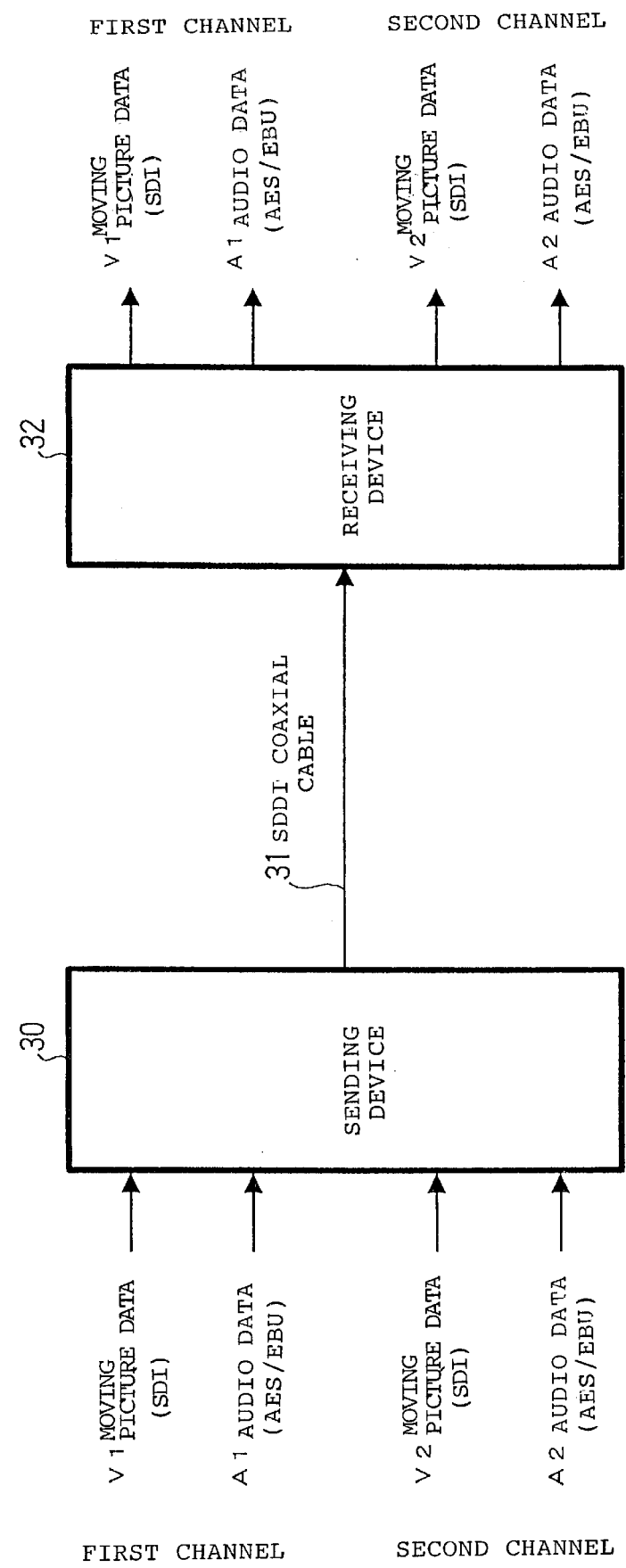
FIG. 8 is a diagram showing a transmission form of a two-channel compressed moving picture transmission system in the case of SDDI direct coupling of an embodiment of a sending and receiving device according to the present invention.
Figure 9:
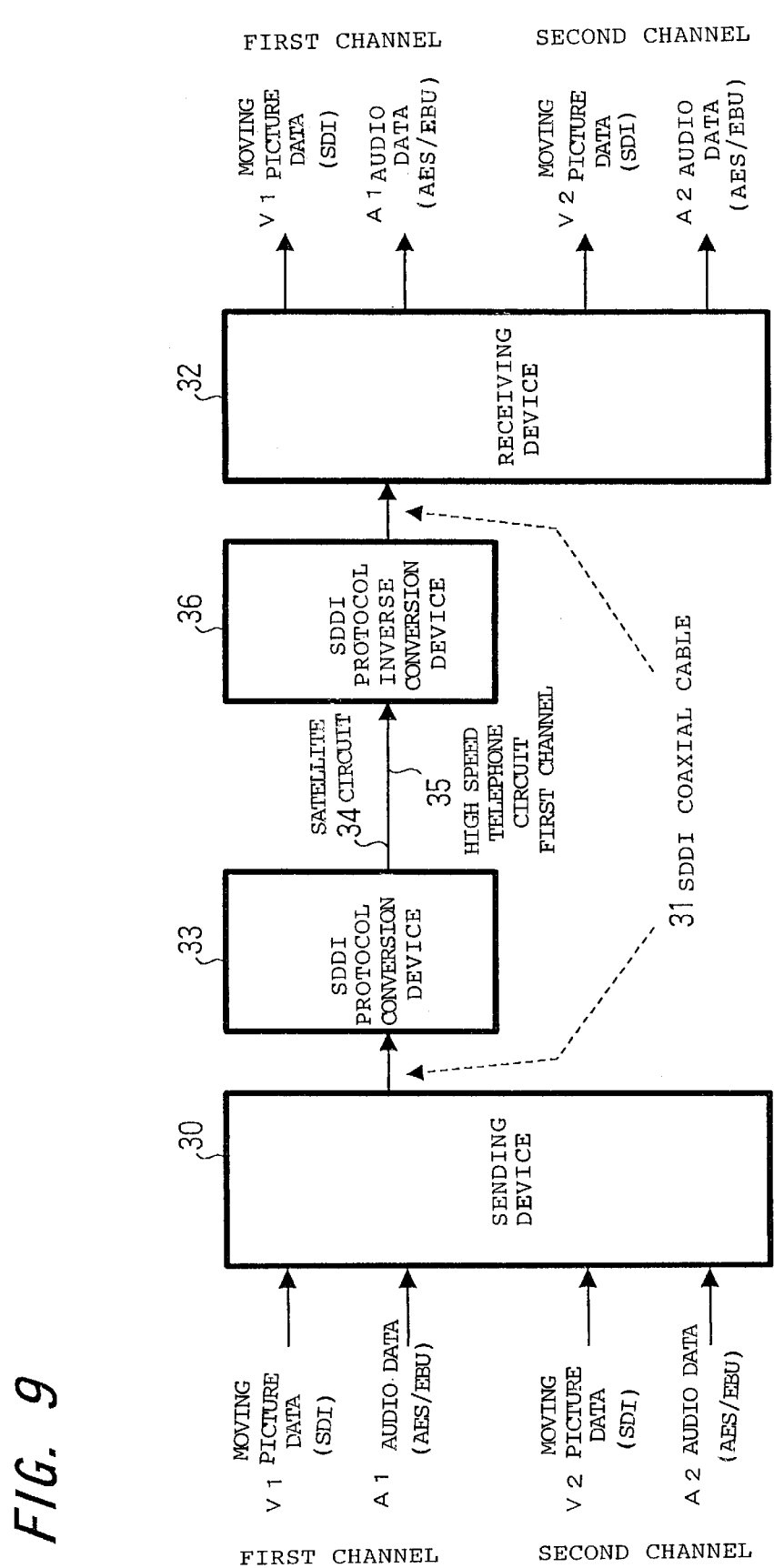
FIG. 9 is a diagram showing a transmission form of a two-channel compressed moving picture transmission system in the case of relay using a satellite network line or a high speed telephone network line of an embodiment of a sending and receiving device according to the present invention.

The two-channel compressed moving picture data transmission system shown in FIG. 9 differs from that shown in FIG. 8 in that there are provided the SDDI protocol conversion device 33 for converting the transmission protocol of the moving picture data of the SDDI format to the transmission protocol for the satellite line 34 or the high speed telephone line 35, the satellite line 34 or the high speed telephone line 35, and the SDDI protocol inverse conversion device 36 for converting the transmission protocol for the satellite line 34 or the high speed telephone line 35 to the transmission protocol of the moving picture data of the SDDI format. The remaining configuration and operation are the same as those of FIG. 8, and description thereof will be omitted. Here, the satellite line 34 or the high speed telephone line 35 is a line dedicated to data transmission.

Thus, by diverting the conventional single-channel compressed moving picture transmission system and arranging compressed moving picture data of two channels on the SDDI format at a predetermined timing, the compressed moving picture data of the two channels can be transmitted over a comparatively long distance at high speed by using the satellite line 34 or the high speed telephone line 35.

Here, the SDI format which becomes the premise of the SDDI format will be described in brief. As the standard of the serial interface, the SMPTE (Society of Motion Picture and Television Engineers) 259M was standardized. Such a serial interface prescribes a procedure for adding a serial synchronizing signal to data, making data serial, and sending the serial data and a procedure of making the data parallel again on the basis of the serial synchronizing signal. In this way, it has become possible to conduct long distance transmission by using a serial interface over one cable.

As against the SDI (Serial Digital Interface) scheme standardized in the SMPTE 259M, there is the SDDI (Serial Digital Data Interface) scheme individually developed by the applicant of present invention. While the SDDI scheme is more suitable for application of multimedia and multi-channel, it is a transmission system having high compatibility with the SDI scheme.

Hereafter, the SDDI format will be described.

First of all, the application range to which the SDDI format is applied will now be described. Standards of this SDDI format prescribe the method for transmitting packeted data in, for example, a broadcasting station or a production house. The data packets and the synchronizing signal have compatibility with the SMPTE 259M (4:2:2 Component SDI). In other words, the SDDI format is configured so that data of the SDDI format may be converted to data of the SDI format and data of the SDI format may be converted to data of the SDDI format. Furthermore, parameters of the signal format have compatibility with those of the SMPTE 259M (4:2:2 Component SDI).

Figure 10:
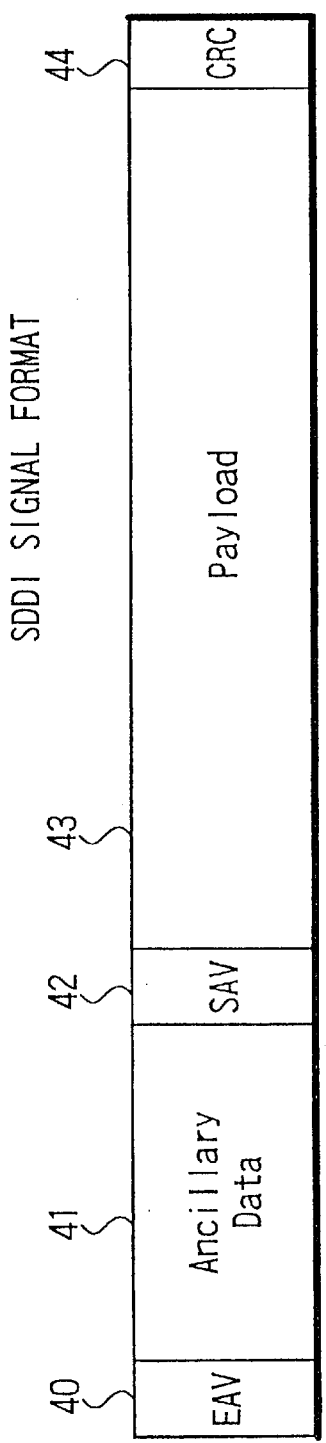
FIG. 10 is a diagram showing a SDDI signal format of an embodiment of a sending device according to the present invention.

As shown in FIG. 10, the signal format of the SDDI format has EAV (End of Active Video) 40, ancillary data 41, SAV (Start of Active Video) 42, payload 43 having user data, and CRC (Cyclic Redundancy Check) 44 nearly in the same way as the signal format of the SDI format. Here, the payload 43 corresponds to active video ACV1 and ACV2 included in the signal format of the SDI format. Unlike the signal format of the SDI format, in the signal format of the SDDI format, the ancillary data does not include audio data and the payload has video data, audio data, and control data. Furthermore, the EAV and SAV are separation codes of the signal. The ancillary data 41 has a header including the synchronizing signal. The CRC 44 is a CRC code used for error detection and error correction of a part of the ancillary data 41 and the payload portion.

Furthermore, the data stream can transmit any packet data or signal having a maximum data rate of 234 Mbit/s or less.

Standards cited in the description will now be shown. If these standards are hereafter cited, they are regarded as a part of this standard. When this standard was established, the following standards were the newest standards. Since they might be revised, however, it should be examined when handling this standard whether the newest edition can be applied.

SMPTE 125M, for Television—Component Signal 4:2:2 Bit-Parallel Digital Interface SMPTE 259M, for Television—10-bit 4:2:2 Component and 4fsc NTSC Composite Digital Signals—Serial Digital Interface SMPTE 291M, for Television—Ancillary Data Packet and Space Formatting General specifications will now be described. The clock signal is similar to that prescribed in the SMPTE 125M. The timing reference signal (EAV and SAV) is generated at every line. This is similar to that prescribed in the SMPTE 125M. The level and specifications of the signal are similar to those prescribed in the SMPTE 259M. The data rate of the serial data stream is at most 270 Mbit/s. As for the connector to be used, the same type as that prescribed in the SMPTE 259M is desirable. The characteristics of the interface need to be capable of ensuring that the signal loss at 135 MHz caused by the characteristics of the coaxial cable will not exceed approximately 30 dB.

Figure 11:
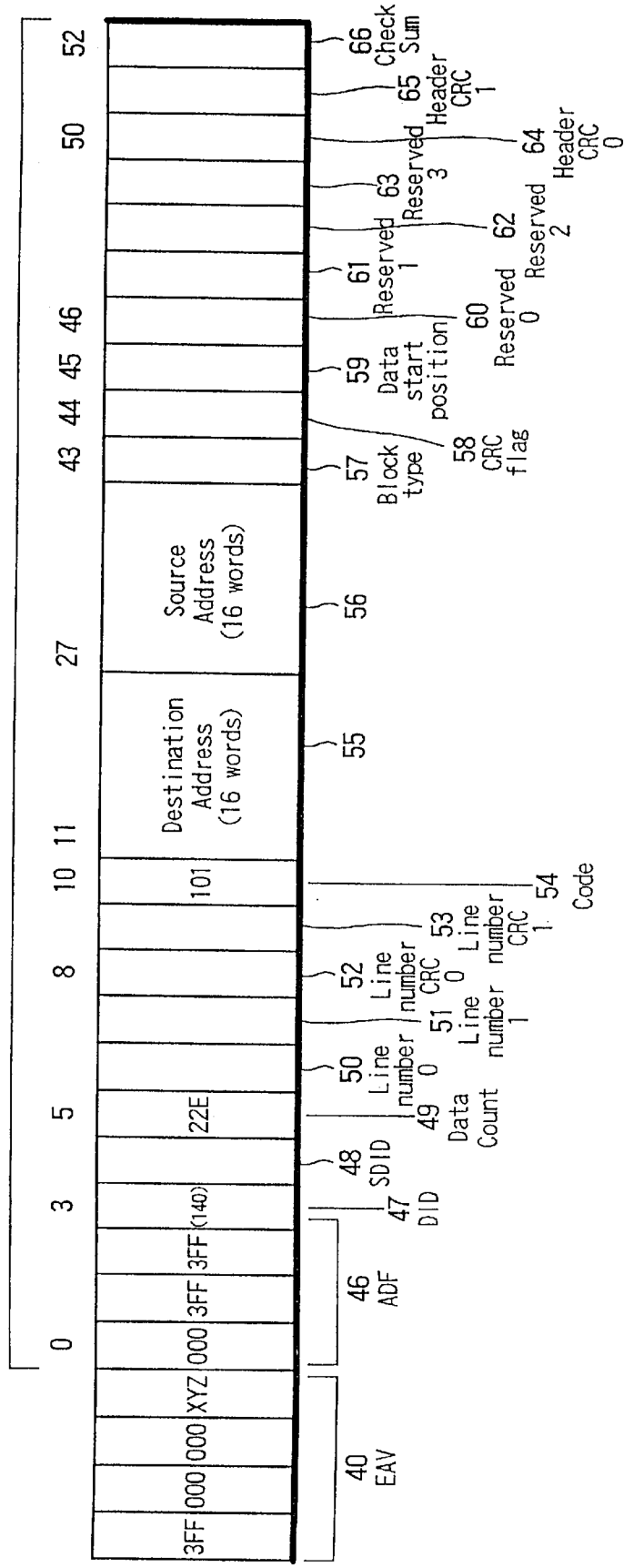
FIG. 11 is a diagram showing a SDDI header data packet of an embodiment of a sending device according to the present invention.

The SDDI header will now be described. In FIG. 11, a SDDI header data packet is shown in FIG. 11. The SDDI header data packet is formed by 53 words. The SDDI header is disposed immediately after the EAV 40. This follows Ancillary Data Packet (Type 2) of the SMPTE 291M.

An ADF (Ancillary Data Flag) 46 is the same as that prescribed in the SMPTE 125M, and is formed by three words, i.e., 000h, 3FFh, and 3FFh. A SDDI header is disposed so as to follow this.

In an example in which the ancillary data of the SDDI header is discriminated, a DID (Data ID) 47 is set so as to have a value of 140h. The DID (Data ID) 47 is formed by a data part having eight low-order bits of B7 through B0 and a parity part having two high-order bits of B8 and B9. The B8 is an even parity for B7 through B0. The B9 is a complement of B8.

A SDID (Secondary Data ID) 48 is formed by a data part having eight low-order bits of B7 through B0 and a parity part having two high-order bits of B8 and B9. The B8 is an even parity for B7 through B0. The B9 is a complement of B8.

A DC (Data Count) 49 is formed by a data part having eight low-order bits of B7 through B0 and a parity part having two high-order bits of B8 and B9. The B8 is an even parity for B7 through B0. The B9 is a complement of B8.

A line number is formed by two words of a line number 0 (50) and a line number 1 (51). As shown in FIG. 12, the line number includes L9 through L0 representing the line numbers, R5 through R0 representing reserved bits, EP1 representing an even parity for L7 through L0, and EP2 representing an even parity for R5 through R0, L9, and L8.

Subsequently to the line number 50 and 51, line numbers CRC 52 and 53 are disposed. The line number CRC is formed by two words 52 and 53. As shown in FIG. 13, the line number CRC includes B0 through B8 representing check codes C8 through C0, B9 representing its complement, B0 through B8 representing check codes C17 through C9, and B9 representing its complement. The line number CRC is intended for all of 10 bit width of 5 words ranging from the data ID to the line number 1. The generator polynomial for the line number CRC is $G(X)=X^{18}+X^5+X^4+1$. This is the same as that prescribed in ITU—T X. 25 which prescribes the international telecommunication criteria.

Figure 14:
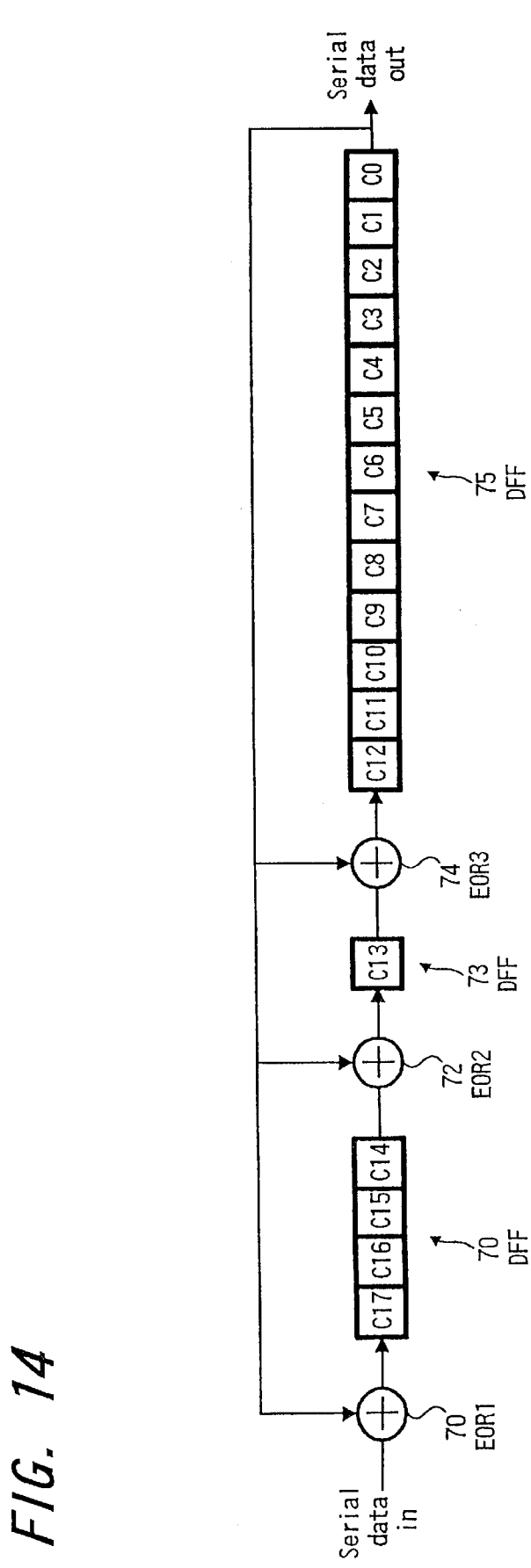
FIG. 14 is a diagram showing a circuit for generating line number CRCs of a SDDI of an embodiment of a sending device according to the present invention.

A circuit for generating the line number CRC 52 and 53 is shown in FIG. 14. In FIG. 14, the generation circuit includes an exclusive OR circuit 70 supplied with input serial data and output serial data of an 18th stage fed back to a first stage, a four stage D flip-flop 71 supplied with an output of the exclusive OR circuit 70, an exclusive OR circuit 72 supplied with output of the D flip-flop 71 and the output serial data fed back to a fourth stage, a single stage D flip-flop 73 supplied with an output of the exclusive OR circuit 72, an exclusive OR circuit 74 supplied with an output of the D flip-flop 73 and the output serial data fed back to a fifth stage, and a thirteen stage D flip-flop 75 supplied with an output of the exclusive OR circuit 74 and outputting output serial data of the final stage, i.e., the 18th stage.

By the eighteen-stage D flip-flops 71, 73 and 75, an 18-bit feedback shift register is thus formed. By feeding back outputs of the 18th stage, the 5th stage, and the 4th stage to the first stage in such a generation circuit and conducting exclusive OR operations, error detection codes are generated by a modulation method based upon the above described generator polynomial.

Initial values of the line number CRC 52 and 53 are respectively set to IFFh and IFFh by the eighteen-stage D flip-flops 71, 73 and 75 of the generation circuit.

Code 54 represents the kind of data included in the payload. The code 54 is formed by one word, and has the following value. A value of 101h indicates that data in the payload represents the SDDI, and a value of 200h indicates that data in the payload represents the SDI.

A destination address 55 represents the address of the data transmission destination, and a source address 56 represents the address of the data transmission source. Each of the destination address and the source address is formed by 16 words.

A block type 57 is provided to identify payload segmentation. The block type is formed by a data part having eight low-order bits of B7 through B0 and a parity part having B8 and B9. The B8 is an even parity for B7 through B0. The B9 is a complement of B8.

The block type has a value in the range of 101h to 146h depending upon the fixed block size. By making the word and block different, segmentation is set. The maximum value of the user data word set by this segmentation is 1438 words per line.

The block type for a variable block size has a value of 1C1h. For a variable block size, continuous user data words of at least 1438 words are recognized.

A CRC flag 58 identifies existence of CRC in the payload. The CRC flag 58 is formed by one word. If the CRC flag has a value of 101h, the CRC is placed in the end of the payload (active). If the CRC flag has a value of 200h, the CRC is not placed in the payload (inactive).

Figure 15:
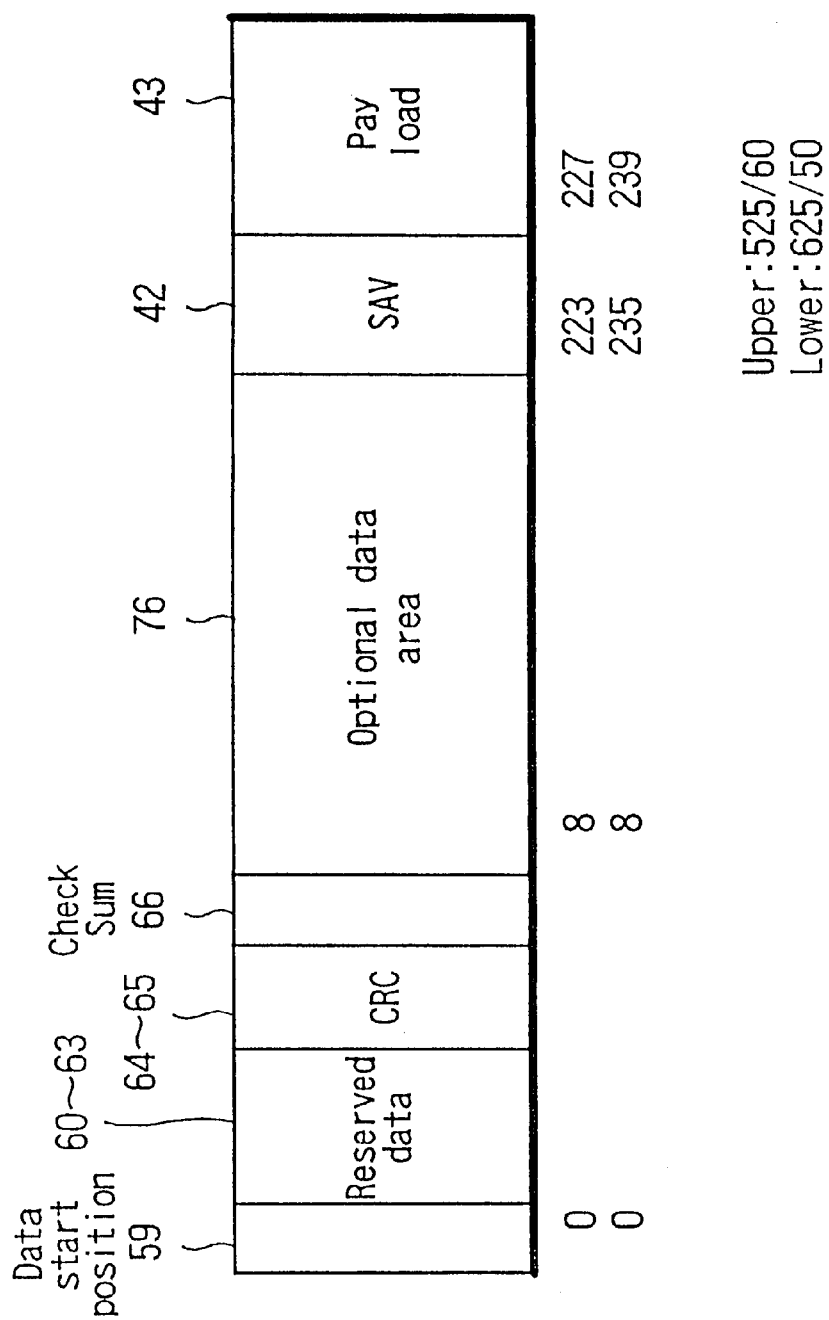
FIG. 15 is a diagram showing a data start position of a SDDI of an embodiment of a sending device according to the present invention.

A data start position 59 represents the position at which the payload starts. As shown in FIG. 15, the data start position 59 has a value of 1EFh (227th) in a 525/60 system, and has a value of 1EFh (239th) in a 625/50 system. If the payload is expanded to the maximum size by using the remainder of the ancillary data area, however, the data start position 59 has a value of 108h (eighth word). At this time, user data is inserted after a check sum address. Even in the case where the payload is expanded, the SAV must be within the data stream. The data start position 59 is formed by a data part having eight low-order bits of B7 through B0 and a parity part having B8 and B9. The B8 is an even parity for B7 through B0. The B9 is a complement of B8.

Header expansion reserved data formed by reserved 0 (60), reserved 1 (61), reserved 2 (62), and reserved 3 (63) is placed after the data start position 59.

Header CRC 0 (64) and header CRC 1 (65) are inserted subsequently to the ancillary data. The header CRCs are intended for all of 10 bits width of words ranging from the code 54 to the reserved 3 (63). The generator polynomial for the header CRC is the same as that for the line number CRC 52.

The word of the check sum 66 is provided to confirm the validity of the data ranging from the data ID 47 to the header CRC 1 (65).

The user data signal format will now be described. The user data is inserted in lines 12 to 275 in the 525/60 system, and in lines 8 to 321 in the 625/50 system.

The 9-bit to 10-bit mapping of the user data will now be described. As shown in FIG. 16, the user data is formed by a data part including eight low-order bits B7 through B0 and an even parity B8 for the B7 through B0, or it is formed by a data part including nine low-order bits B8 through B0 and a parity part having B9 which is a complement of B8.

Figure 17:
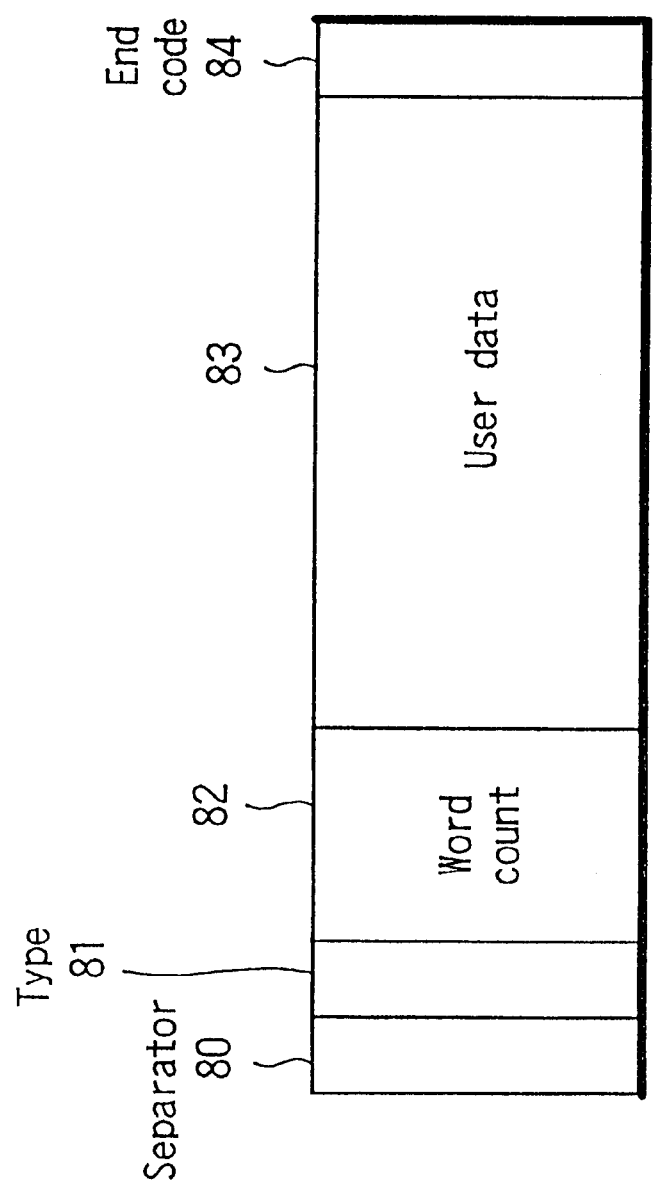
FIG. 17 is a diagram showing a user data header of a fixed block size of a SDDI of an embodiment of a sending device according to the present invention.
Figure 18:
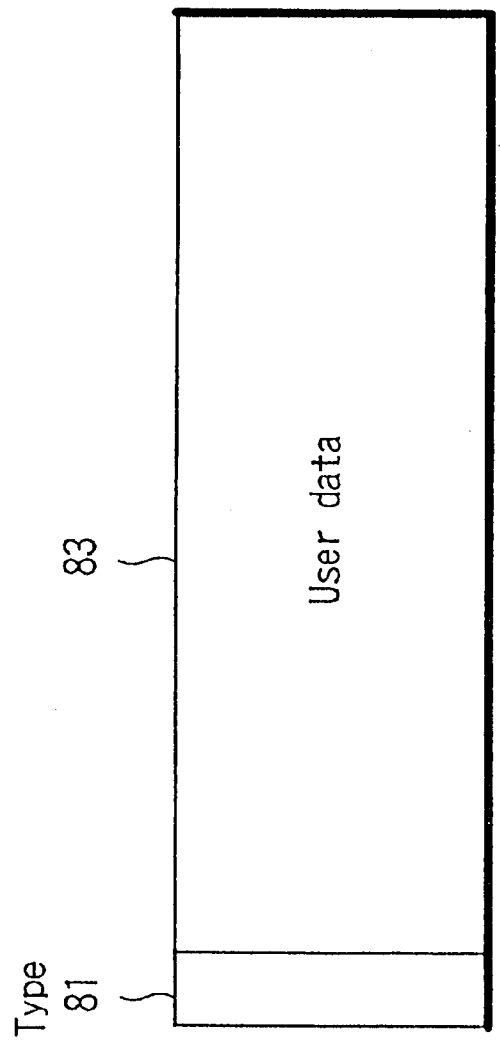
FIG. 18 is a diagram showing a user data header of a variable block size of a SDDI of an embodiment of a sending device according to the present invention.

The user data header will now be described. Before each block of the user data, the user data header is placed. The user data header is formed as shown in FIG. 17 in the case of a fixed block size, and formed as shown in FIG. 18 in the case of a variable block size. In the case of a fixed block size, a user data header formed by a separator 80, a type 81, and a word count 82 as shown in FIG. 17 is placed before user data 83, and an end code 84 is placed at the end. In the case of a variable block size, a user data header formed by the type 81 as shown in FIG. 18 is placed before the user data 83.

If the block type 57 is identified as the variable block size, the separator 80, the end code 84, and the word count 82 are inserted in FIG. 18. Each data block begins with the separator 80 and ends with the end code 84. The separator 80 has a value of 309h, and the end code 84 has a value of 30Ah.

The word count 82 is formed by four words as shown in FIG. 19. The word count represents the number of user data words. The word count includes data C31 through C0, an even parity EP1 for C7 through C0, an even parity EP2 for C15 through C8, an even parity EP3 for C23 through C16, and an even parity for C31 through C24.

The type 81 is used to identify the type of the data stream. The type 81 is able to have 256 different states. The type 81 is formed by a data part including eight low-order bits B7 through B0 and a parity part having B8 and B9. The B8 is an even parity for B7 through B0. The B9 is a complement of B8.

Furthermore, in the case where the CRC flag is active, the CRC 44 is inserted in the end of the payload as shown in FIG. 10. The CRC 44 is intended for the entire payload. In the case where the payload is expanded, the CRC 44 is also intended for the expanded user data area. The generator polynomial for the CRC 44 is the same as the generator polynomial for the header CRC 64 and 65 and the line number CRC 52 and 53.

Hereafter, the present embodiment will be described. The present embodiment is a system for converting picture data formatted by the SDI scheme to the format of the SDDI scheme and transmitting compressed moving picture data of two channels by using a transmission path of the SDDI scheme. First of all, the configuration of the transmitting device will be described. The sending device is formed by a sending device corresponding to two channels by diverting the conventional single-channel compressed moving picture transmission system using a SDDI transmission path shown in FIG. 1.

Figure 4:
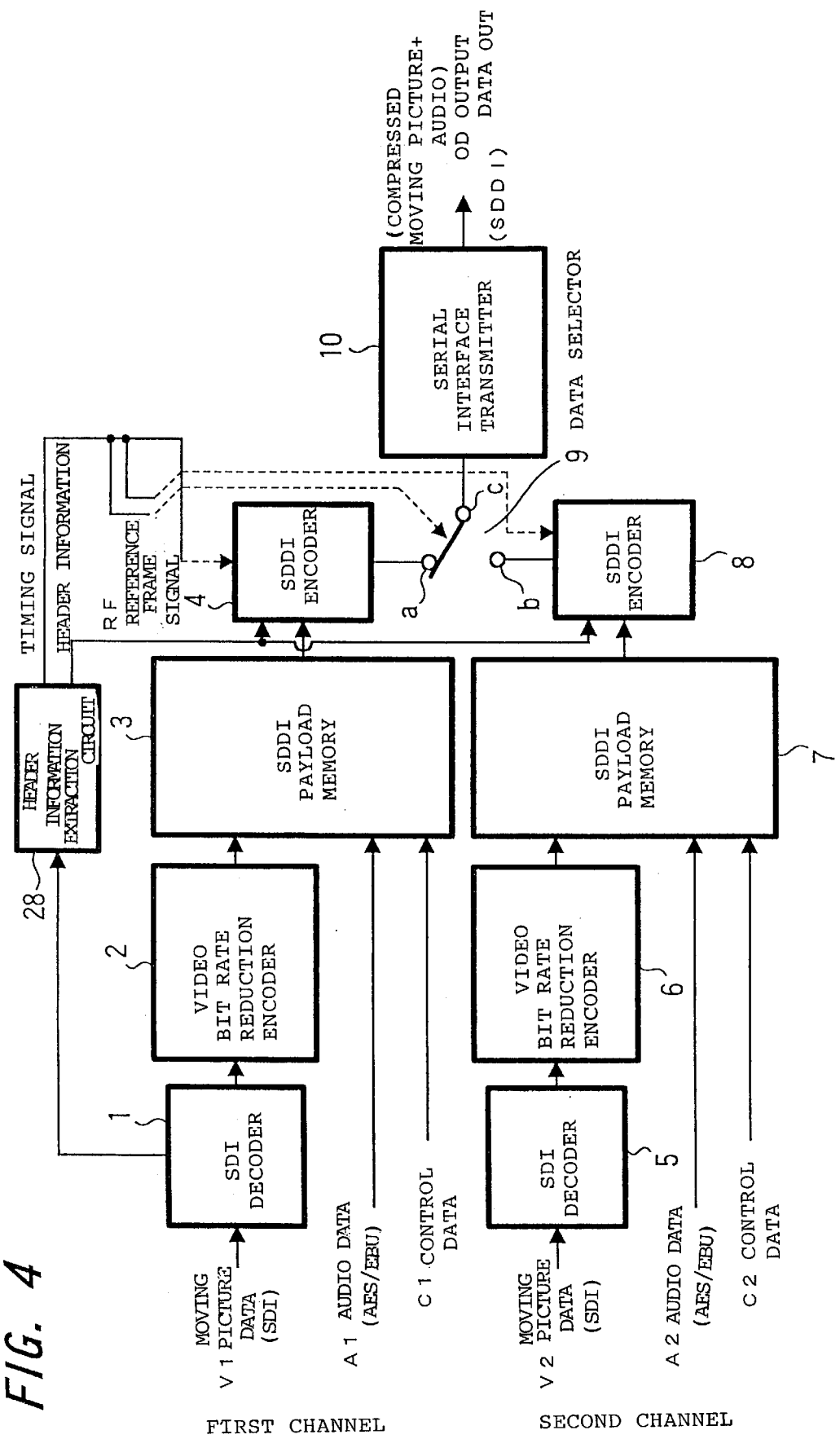
FIG. 4 is a block diagram showing the configuration of a sending device of a two-channel compressed moving picture transmission system of an embodiment of a sending device according to the present invention.
Figure 5:
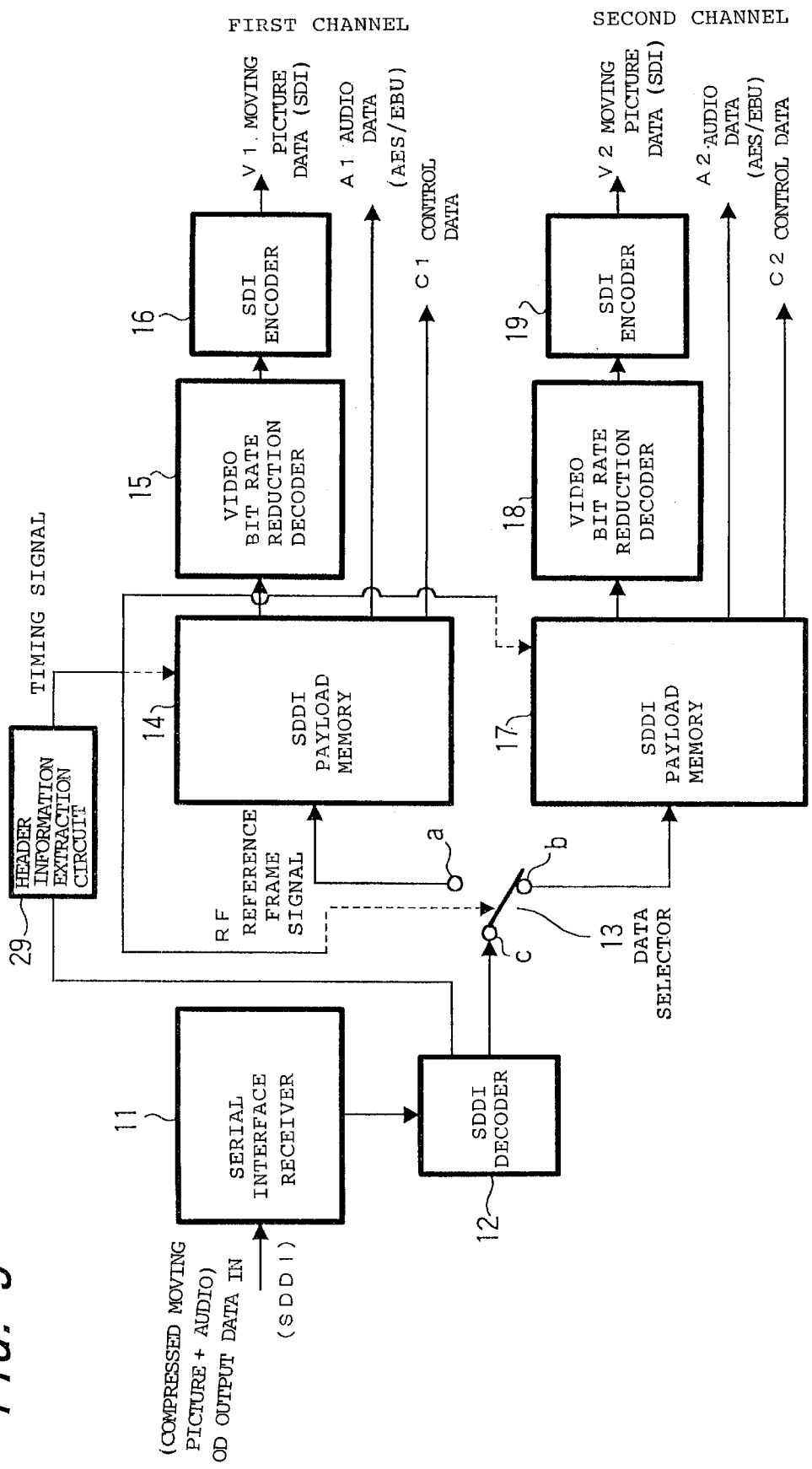
FIG. 5 is a block diagram showing the configuration of a receiving device of a two-channel compressed moving picture transmission system of an embodiment of a receiving device according to the present invention.

As a sending system of a first channel, the sending device shown in FIG. 4 includes a SDI decoder 1 for restoring original digital data from moving picture data V1 of the first channel formatted in the SDI scheme, a video bit reduction encoder 2 for compressing the digital data to approximately ⅛, a SDDI payload memory 3 for conducting preprocessing of converting the compressed picture data, audio data A1 of the first channel formatted in the AES/EBU scheme, control data C1 of the first channel to the format of the SDDI scheme at the time of writing, and a SDDI encoder 4 for adding a header part and the like containing a synchronizing signal to the data for payload on the basis of a predetermined reference frame signal RF and generating data of the format of the SDDI scheme.

Furthermore, as a sending system of a second channel, the sending device includes a SDI decoder 5 for restoring original digital data from moving picture data V2 of the second channel formatted in the SDI scheme, a video bit reduction encoder 6 for compressing the digital data to approximately ⅛, a SDDI payload memory 7 for conducting preprocessing of converting the compressed picture data, audio data A2 of the second channel formatted in the AES/EBU scheme and control data C2 of the second channel to the format of the SDDI scheme at the time of writing, and a SDDI encoder 8 for adding a header part and the like containing a synchronizing signal to the data for payload on the basis of the predetermined reference frame signal RF and generating data of the format of the SDDI scheme.

Furthermore, the sending device includes a data selector 9 for selecting the data of the first channel having the format of the SDDI scheme generated by the SDDI encoder 4 or the data of the second channel having the format of the SDDI scheme generated by the SDDI encoder 8 on the basis of the reference frame signal RF, and a serial interface transmitter 10 for converting the original data of the first channel and the second channel of the format of the SDDI scheme selected by the data selector 9 to a serial form and sending them serially as output data OD.

Furthermore, the sending device has a header information extraction circuit 28 for detecting a reference frame signal RF serving as a timing signal by detecting "F" from a synchronizing word detected by the SDI decoder of the first channel and shown in FIG. 20 and for detecting header information. The timing signal detected by this header information extraction circuit 28 is supplied to the SDDI encoders 4 and 8 and a control terminal of the data selector 9 as the reference frame signal RF. On the basis of the reference signal RF, the data selector 9 is controlled to be changed to the first channel when the "F" of XYZ in the synchronizing word shown in FIG. 20 is "0", i.e., for the first field, and to the second channel when the "F" is "1," i.e., for the second field. Furthermore, the header information is supplied to the SDDI encoders 4 and 8.

Here, the control data C1 and C2 are control data concerning control of channels and the like of the moving picture data V1 and V2 and the audio data A1 and A2. The payload is a part accommodating the user data in the format of the SDDI scheme.

Furthermore, the sending device has a function of conducting compression processing on the moving picture data VI and the moving picture data V2 of the SDI format, converting the audio data A1 and the audio data A2 and the moving picture data V1 and the moving picture data V2 subjected to the compression processing to the SDDI format, converting them to output data so as to arrange them on the SDDI format, and sending the output data.

Furthermore, the video bit rate reduction encoders 2 and 6 include a DCT (Discrete Cosine Transform) circuit for converting data of time component to data of frequency component, a quantizing circuit for removing a high frequency component from the frequency component by conducting quantization computation, and a VLC (Variable Length Coding) circuit using the run length coding and Huffman coding. In accordance with the present invention, the bit rate reduction encoders 2 and 6 make four fields a GOP (group of picture) and conducts coding so that the received data may become I pictures and B pictures. Therefore, coded data is formed by repetitive data represented as an I picture, a B picture, an I picture, a B picture, . . . .

Each of the SDDI encoders 4 and 9 includes a synchronizing signal addition circuit for adding a synchronizing signal such as a synchronizing word or the like to data for payload. Furthermore, the serial interface transmitter 10 includes a clock generation circuit for generating a clock from a data train by using, for example, a PLL circuit, a channel code circuit for conducting channel coding by using scrambled NRZI (Non Return to Zero) for data transmission, and a scramble circuit for arranging data at random on the basis of a generation circuit formed by a shift register and an exclusive OR circuit for feeding back from a predetermined stage.

The sending device having such a configuration operates as hereafter described.

When the moving picture data V1 of the first channel formatted according to the SDI scheme is supplied to the SDI decoder 1, the moving picture data V1 of the first channel is processed in the SDI decoder 1 so as to restore the original digital data. The restored original digital data is supplied to the video bit rate reduction encoder 2. In the video bit rate reduction encoder 2, the digital data is compressed to approximately ⅛ by using the compression scheme of the MPEG while taking four fields as the unit of compression. In FIG. 6C, video data 20V and 21V represent video data of the first channel and the second channel corresponding to first four fields before compression. Furthermore, video data 22V and 23V represent video data of the second channel corresponding to the next four fields before compression. Control data 20C and 21C represent control data of the first channel and the second channel corresponding to first four fields. Audio data 20A and 21A represent audio data of the first channel and the second channel corresponding to first four fields. Furthermore, control data 22C and 23C represent control data of the first channel and the second channel corresponding to the next four fields. Audio data 22A and 23A represent audio data of the first channel and the second channel corresponding to the next four fields.

In the video bit rate reduction encoder 2, data of time component is converted to data of frequency component by the DCT circuit, the quantization computation is conducted by the quantizing circuit to remove a high frequency component from the frequency component, and the variable length coding is conducted by the VLC circuit on the basis of the run length coding and the Huffman coding. As a result, the moving picture data is compressed to approximately ⅛ as compared with the original data length. To be concrete, the MPEG compression is conducted for each at every one GOP unit formed by four fields to generate compressed moving picture data as described before.

The compressed moving picture data corresponding to four fields and the corresponding audio data A1 and control data C1 of the four fields are-supplied to the SDDI payload memory 3. At the time of writing into the SDDI payload memory 3, the compressed moving picture data of the first channel, the audio data A1, and the control data C1 are stored in the payload memory 3 as compressed data 20 of the first channel as shown in FIG. 6B.

The compressed data 20 of the first channel stored in the payload memory 3 is supplied to the SDDI encoder 4. On the basis of the reference frame signal RF shown in FIG. 6A, the SDDI encoder 4 adds a header and the like containing a synchronizing signal which is not illustrated to the compressed data 20 of the first channel stored in the payload memory 3 so as to generate data conforming to the SDDI format. Thereby, the SDDI encoder 4 can generate the compressed data 20 of the first channel conforming to the SDDI format.

In other words, in the SDDI encoder 4, the synchronizing signal such as the synchronizing word or the like is added to data of the payload memory 3 by the synchronizing signal addition circuit and resultant data is output on ten data lines in parallel. In the clock generation circuit of the interface transmitter 10, a clock is generated from the data train by using a PLL circuit. In the channel code circuit, channel coding is conducted for data transmission by scrambled NRZ1. In the generation circuit of the scramble circuit, its initial value is shifted and a predetermined stage is fed back by the exclusive OR circuit, and data are arranged at random. Output data OD as shown in FIG. 6B is output serially.

As understood from the description heretofore made, the compressed data 20 of the first channel conforming to the SDDI format can be generated from the supplied video data V1 corresponding to four fields and the audio data A1 of four fields corresponding to that video data by digital processing conducted in the SDI decoder 1, the video bit rate reduction encoder 2, and the SDDI encoder 4.

Furthermore, by conducting the digital processing in the SDI decoder 1, the bit rate reduction encoder 2, and the SDDI encoder 4 with respect to video data of the next four fields as described above, compressed data 22 of the first channel conforming to the SDDI format can be generated from the video data V1 of the next four fields and the audio data A2 of four fields corresponding to that video data.

When the moving picture data V2 of the second channel formatted according to the SDI scheme is supplied to the SDI decoder 5, the moving picture data V2 of the second channel is processed in the SDI decoder 5 so as to restore the original digital data. The restored original digital data is supplied to the video bit rate reduction encoder 6. In the video bit rate reduction encoder 6, the digital data is compressed to approximately ⅛ by using the MPEG compression scheme while taking four fields as one unit of compression.

To be concrete, in the video bit rate reduction encoder 6, data of time component is converted to data of frequency component by the DCT circuit, the quantization computation is conducted by the quantizing circuit to remove a high frequency component from the frequency component, and the variable length coding is conducted by the VLC circuit on the basis of the run length coding and the Huffman coding. As a result, the moving picture data is compressed to approximately ⅛ as compared with the original data length. In the present embodiment, the video data V2 of the second channel corresponding to four fields are subjected to the MPEG compression in the video bit rate reduction encoder 6 in the same way as the video data V1 of the first channel.

The compressed moving picture data corresponding to four fields and the audio data A2 and control data C2 are supplied to the SDDI payload memory 7. At the time of writing into the SDDI payload memory 7, the compressed moving picture data of the second channel, the audio data A2, and the control data C2 are stored in the payload memory 7 as compressed data 21 of the second channel in the state shown in FIG. 6B.

The compressed data 21 of the second channel stored in the payload memory 7 is supplied to the SDDI encoder 8. On the basis of the reference frame signal RF shown in FIG. 6A, the SDDI encoder 8 adds a header and the like containing a synchronizing signal which is not illustrated to the compressed data of the second channel stored in the payload memory 7. Thereby, the SDDI encoder 8 can generate the compressed data 21 of the second channel conforming to the SDDI format.

In other words, in the SDDI encoder 8, the synchronizing signal such as the synchronizing word or the like is added to data of the payload memory 7 by the synchronizing signal addition circuit and resultant data is output on ten data lines in parallel. In the clock generation circuit of the interface transmitter 10, a clock is generated from the data train by using the PLL circuit. In the channel code circuit, channel coding is conducted for data transmission by scrambled NRZ1. In the generation circuit of the scramble circuit, its initial value is shifted by the shift register and a predetermined stage is fed back by the exclusive OR circuit, and data are arranged at random. Output data OD as shown in FIG. 6B is output serially.

As understood from the description heretofore made, the compressed data 21 of the second channel conforming to the SDDI format can be generated from the supplied video data V2 corresponding to four fields and the audio data A2 of four fields corresponding to that video data by respective digital processing in the SDI decoder 5, the video bit rate reduction encoder 6, and the SDDI encoder 8.

Furthermore, by conducting the digital processing in the SDI decoder 5, the bit rate reduction encoder 6, and the SDDI encoder 8 with respect to video data V2 of the next four fields as described above, compressed data 23 of the second channel conforming to the SDDI format can be generated from the video data V2 of the next four fields and the audio data A2 of four fields corresponding to that video data.

The data 20 and 22 of the first channel having the SDDI format generated in the SDDI encoder 4 are supplied to a stationary contact 9a of the data selector 9 in parallel. Further, the data 21 and 23 of the second channel having the SDDI format generated in the SDDI encoder 8 are supplied to a stationary contact 9b of the data selector 9 in parallel. Here, a switching control terminal of the data selector 9 is supplied with the reference frame signal RF as shown in FIG. 6A. On the basis of the reference frame signal RF, therefore, a movable contact 9c of the data selector 9 is controlled with a period equivalent to four fields. To be concrete, the movable contact 9c of the data selector 9 is connected to the stationary contact 9a in a first field interval, and the movable contact 9c of the data selector 9 is connected to the stationary contact 9b in a second field interval.

To be concrete, in the header information extraction circuit 28, the reference frame signal RF serving as the timing signal is detected by detecting "F" from a synchronizing word detected by the SDI decoder of the first channel and shown in FIG. 20, and header information is detected. The timing signal detected by this header information extraction circuit 28 is supplied to the SDDI encoders 4 and 8 and the control terminal of the data selector 9 as the reference frame signal RF. On the basis of the reference signal RF, the data selector 9 is controlled so as to receive the first channel when the "F" of XYZ in the synchronizing word shown in FIG. 20 is "0," i.e., for a first field, and receive the second channel when the "F" is "1." Furthermore, the header information is supplied to the SDDI encoders 4 and 8.

Figure 6:
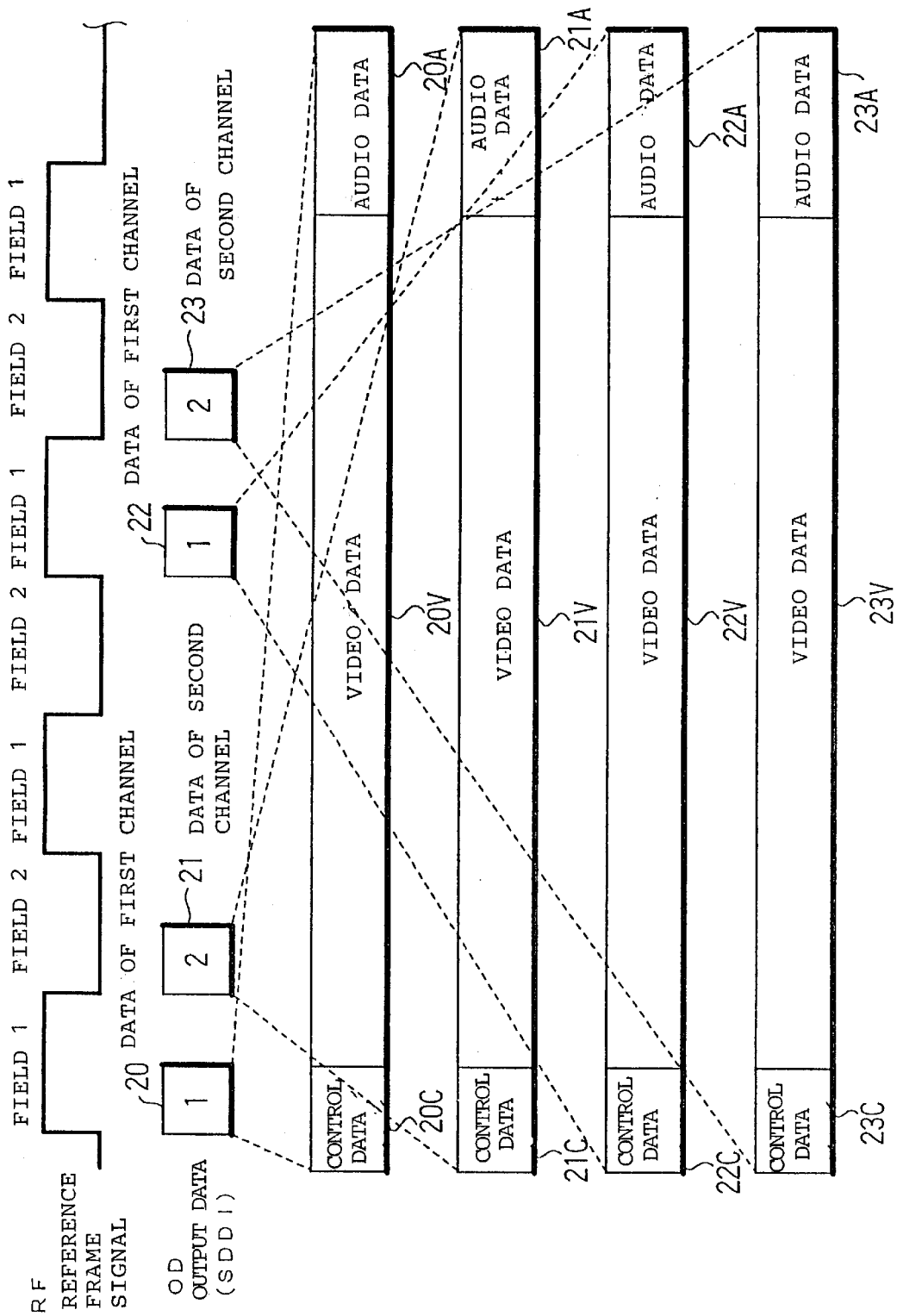

In a first field interval, therefore, the compressed data 20 of the SDDI format of the first channel generated from the video/audio data of the first four fields of the first channel is output as shown in FIG. 6. In a second field interval, the compressed data 21 of the SDDI format of the second channel generated from the video/audio data of the first four fields of the second channel is output. In a fifth field interval, the compressed data 22 of the SDDI format of the first channel generated from the video/audio data of the next four fields of the first channel is output. In a sixth field interval, the compressed data 23 of the SDDI format of the second channel generated from the video/audio data of the next four fields of the second channel is output.

In association with field 1 or field 2 at every four fields, the compressed data 20 and 22 of the SDDI format of the first channel and the compressed data 21 and 23 of the SDDI format of the second channel are thus serially output at selectively changed timing by the data selector 9 and the reference frame signal RF. Such operation is conducted in order to utilize the transmission interval effectively. In other words, video data of four fields are transmitted in a field interval by compressing the video data. As a result, transmission time to spare can be obtained in three remaining field intervals. In the present invention, therefore, video data of other channels are transmitted in the three remaining field intervals to make the most of the three remaining field intervals.

The compressed data 20 and 22 of the SDDI format of the first channel or the compressed data 21 and 23 of the SDDI format of the second channel thus output at selectively changed timing by the data selector 9 and the reference frame signal RF so as to correspond to the first field or the second field in four fields taken as one period are supplied to the serial interface transmitter 10. In the serial interface transmitter 10, the output OD of the SDDI format is serially transmitted as the compressed data 20 and 22 of the first channel and the compressed data 21 and 23 of the second channel every four fields.

In the aforementioned embodiment of FIGS. 4 and 6, an example of multiplex transmission of the two channels, i.e., the first channel and the second channel has been described. In the present embodiment, however, the unit of compression in the video bit reduction encoders 2 and 6 is set equal to four fields. In theory, therefore, multiplex transmission of up to four channels at maximum is possible.

Furthermore, in the embodiment of the present invention, the unit of compression (GOP) in the video bit rate reduction coders 2 and 6 is set equal to four fields. However, this unit can be arbitrarily chosen. If the GOP is set equal to, for example, ten fields, then multiplex transmission of up to ten channels at maximum can be made possible according to the present invention.

Taking edition processing conducted after the data compression into consideration, however, it is most desirable to set the unit of compression equal to approximately four fields as in the present invention.

Next, the reference frame signal RF will be described in more detail.

In the SDDI format, data are grouped into blocks (packets) in order to transmit the data serially. In the SDDI format, video data and audio data are synchronized at the time of this blocking by using a timing reference signal. As shown in FIG. 20, the timing reference signal 90 includes data such as "3FF,000,000" defined as a synchronizing word and "XYZ" defined as a timing word or the like. The synchronizing word and the timing word are disposed in the EAV 40 and SAV 42 shown in FIG. 10.

The reason why such a synchronizing word is used will now be described. For allowing determining which position luminance information represented by that picture data belongs to by referring to, for example, the contents or the relation with respect to the preceding or succeeding data when data of B9 (MSB) to B0 (LSB) have transmitted serially, a specific uniquely determined pattern is provided so as to be recognized and information indicating the position is inserted immediately after that pattern. In other words, a pattern which will positively not appear in picture data is used as a synchronizing pattern. In the embodiment of the present invention, a combination of "3FF", "000", and "000" is used as a synchronizing pattern. The synchronizing pattern data formed by "3FF", "000", and "000" is data having twenty consecutive "0"s after ten consecutive "1"s. The probability that the synchronizing pattern does not appear in picture data is 100%. Therefore, the synchronizing pattern in the embodiment of the present invention will positively not be detected falsely as picture data. Furthermore, the timing word "XYZ" is disposed immediately after the synchronizing word "3FF, 000, 000" thus detected certainly. In the same way as the synchronizing word, therefore, the timing word "XYZ" can be detected certainly without false detection.

In the embodiment of the present invention, specific information is defined as this timing word "XYZ". To be concrete, "F" illustrated as a second high-order bit B8 of a timing word "XYZ" 91 indicates the first filed when it is "0", and indicates the second field when it is "1." Furthermore, "V" illustrated as a third high-order bit B7 of the timing word "XYZ" 91 indicates a valid picture interval when it is "0", and indicates a vertical blanking interval when it is "1". By referring to the second high order bit B8 and the third high order bit B7 of the timing word "XYZ" 91, therefore, it can be determined whether the data is located in the first field or the second field, or whether the data is located in the valid picture interval in the horizontal direction or in the vertical blanking interval.

The sending device of the present embodiment is a sending device including a plurality of sending systems, each of the sending systems including the video bit reduction encoders 2 and 6 serving as compression means for compressing picture data, and the SDDI encoders 4 and 8 serving as serial signal generation means for adding a predetermined synchronizing signal to compressed picture data compressed by the compression means a, and thereby generating predetermined serial signal data, serial signal data of a plurality of channels being transmitted from the plurality of sending systems, in which the sending device includes the data selector 9 serving as changeover means for changing over between the serial signal data of a certain channel output from the serial signal generation means of one of the sending systems and serial signal data of another channel output from the serial signal generation means of another sending system included in the plurality of sending systems, according to the reference frame signal RF serving as a changeover signal based upon the synchronizing signal, and the sending device serially transmits the serial signal data of the certain channel and the serial signal data of the another channel according to the changeover signal.

By thus sending out compressed moving picture data of two channels onto the SDDI transmission path field by field, the generally used reference frame signal can be utilized as the channel changeover timing signal in a video system such as a video multiplexer or the like for multiplexing video data. Therefore, the configuration concerning the channel changeover in the sending device can be formed simply and easily.

Furthermore, by combining two sending devices of existing single-channel compressed moving picture transmission system, the sending device of the two-channel compressed moving picture transmission system of the present embodiment can be easily implemented.

The configuration concerning the channel changeover becomes simple and low in cost. By incorporating the data selector 9 and the reference frame signal RF of the present embodiment into the sending device of the single-channel compressed moving picture transmission system beforehand, therefore, it becomes possible to add to the user side one more sending device of a single-channel compressed moving picture transmission system as occasion demands, combine the two sending devices, and thereby form the sending device of the two-channel compressed moving picture transmission system freely.

Furthermore, in the above described sending device of the present embodiment, the synchronizing signal added to serial signal data has a synchronizing word of "3FF, 000, 000, XYZ" and at least the "F" of the bit B8 of the XYZ indicating the picture field is used as the reference frame signal RF serving as the changeover signal. According to the distinction of the picture field, therefore, compressed picture data of two channels can be serially disposed so as to correspond to the field 1 or the field 2 included in four compressed fields and transmitted.

In the above described example of the sending device, data of the channel 1 and data of the channel 2 are selectively output from the data selector 9 at changed timing so as to correspond to the field 1 or the field 2 at every four fields. Alternatively, the SDDI encoders 4 and 8 may dispose compressed moving picture data at every field of the four fields. In this case, values respectively corresponding to four fields are set by using two other additional bits of the reference signal. For example, "00", "01", "10", and "11" are set respectively for the field 1, field 2, field 3, and field 4. As a result, the SDDI encoders 4 and 8 can determine which of the four fields the field is.

Furthermore, in the above described sending device of the present embodiment, the synchronizing signal added to serial signal data has a synchronizing word of "3FF, 000, 000, XYZ" and two bits included in additional bits B5 through B2 are used as the reference frame signal RF serving as the changeover signal. At every four fields, therefore, compressed picture data of four channels can be serially disposed so as to respectively correspond to four compressed fields and transmitted.

Furthermore, in the above described sending device of the present embodiment, channel identification codes may be added to serial signal data. According to the distinction of the picture field, therefore, compressed picture data of a plurality of channels can be serially disposed so as to respectively correspond to several compressed fields and transmitted.

Next, the configuration of the receiving device will be described. The receiving device is formed by receiving devices corresponding to two channels by diverting the conventional single-channel compressed moving picture transmission system using a SDDI transmission path shown in FIG. 2.

With reference to FIG. 2, the receiving device includes a serial interface receiver 11 for receiving the output data OD of the format of the SDDI scheme shown in FIG. 6B and outputting the output data in parallel, a SDDI decoder 12 for detecting the reference frame signal RF and restoring the original digital data from the output data OD of the format of the SDDI scheme, and a data selector 13 for outputting the output data OD shown in FIG. 6B while selectively changing over from one to another in the data of the first channel and the data of the second channel on the base of the reference frame signal RF.

Furthermore, the receiving device includes, as a receiving system of the first channel, a SDDI payload memory 14 for storing the restored original digital data of the first channel and dividing the restored original digital data of the first channel into the compressed moving picture data, the audio data A1, the control data C1 at the time of reading, a video bit rate reduction decoder 15 for conducting expansion processing on the compressed moving picture data, and a SDI encoder 16 for converting the moving picture V1 subjected to the expansion processing to the format of the SDI scheme and outputting the original moving picture data V1 of the first channel.

Furthermore, the receiving device includes, as a receiving system of the second channel, a SDDI payload memory 17 for storing the restored original digital data of the second channel and dividing the restored original digital data of the second channel into the compressed moving picture data, the audio data A2, the control data C2 at the time of reading, a video bit rate reduction-decoder 18 for conducting expansion processing on the compressed moving picture data, and a SDI encoder 19 for converting the moving picture subjected to the expansion processing to the format of the SDI scheme and outputting the original moving picture data V2 of the second channel.

Furthermore, the receiving device includes an information extraction circuit 29 for detecting the reference frame signal RF serving as the timing signal by detecting the "F" from the synchronizing word detected by the SDDI decoder 12 and shown in FIG. 20. The timing signal detected by this header information extraction circuit 29 is supplied to the SDDI payload memories 14 and 17 as the reference frame signal RF. In addition, the timing signal is supplied to a control terminal of the data selector 13 as well. On the basis of the reference signal RF, the data selector 13 is controlled so as to change over the first field to the first channel when the "F" of XYZ in the synchronizing word shown in FIG. 20 is "0", and change over the second field to the second channel when the "F" is "1".

Furthermore, the receiving device has a function of receiving the output data of the SDDI format transmitted from the sending device, separating output data disposed on the SDDI format, conducting expansion processing on the moving picture data V1 and the moving picture data V2 subjected to the compression processing, inversely converting the moving picture data V1 and the moving picture data V2 subjected to the expansion processing to the SDI format, and outputting the original moving picture data V1 of the SDI format and the audio data A1 of the AES/EBU format of the first channel and the original moving picture data V2 of the SDI format and the audio data A2 of the AES/EBU format of the second channel.

The SDDI decoder 12 includes a synchronizing signal detection circuit for detecting the synchronizing signal such as the synchronizing word or the like, and data. The serial interface receiver 11 includes a clock detection circuit for detecting the clock from a data string by using, for example, a PLL circuit, a channel decode circuit for conducting channel decoding by using a scrambled NRZI for data transmission, and a descramble circuit for restoring the scrambled data to their original positions.

Each of the video bit rate reduction decoders 15 and 18 includes an inverse DCT circuit for inversely converting the frequency component data subjected to the DCT conversion to time component data, an inverse quantizing circuit for conducting inverse quantizing calculation and thereby reproducing the high frequency portion of the frequency component removed by the quantizing, and a VLCD (Variable Length Coding Decoding) circuit using the run length coding and Huffman coding.

The receiving device thus configured operates as hereafter described.

The output data OD of the format of the SDDI scheme is supplied to the serial interface receiver 11. In the serial interface receiver 11, the output data OD of the format of the SDDI scheme is received and the synchronizing word is detected. The received output data OD of the format of the SDDI scheme is converted to parallel data on the basis of the synchronizing word and the parallel data is supplied to the SDDI decoder 12. The SDDI decoder 12 is supplied with the reference frame signal RF as well. In the SDDI decoder 12, therefore, the original digital data of the first channel and the second channel are restored so as to correspond to the interval of the field 1 or the field 2 at every four fields of the reference frame signal RF, from the parallel data converted from the output data OD of the format of the SDDI scheme.

In other words, in the SDDI decoder 12, the synchronizing signal detection circuit detects the synchronizing signal such as the synchronizing word or the like, and data. Furthermore, in the serial interface receiver, the PLL circuit of the clock detection circuit detects the clock from the data string, the channel decode circuit conducts channel decoding by using the scrambled NRZI for the data transmission, and the descramble circuit returns the scrambled data to the original arrangement. It is prescribed that the restored data string should be transmitted in the order beginning with the LSB and ending with the MSB. In the SDDI decoder 12, therefore, operation for attaining synchronizing and determining which data is the LSB is conducted.

In this case, the clock detection circuit operates so as to detect the clock by taking a change point of a bit cell of the data string as the reference by using the PLL circuit. Furthermore, upon detecting the "3FF, 000, 000" of the synchronizing word by using a detector having a length of, for example, 30 bits, the synchronizing signal detection circuit judges an immediately succeeding bit to be the LSB, and operates 0so as to attain synchronizing by taking the LSB as the reference. Once this word synchronizing is detected, it is sufficient to count bits thereafter.

The restored original digital data of the first channel and the second channel are supplied to a movable contact 13c of the data selector 13. A control terminal of the data selector 13 which is not illustrated is supplied with the reference frame signal RF. On the basis of the reference signal RF, therefore, the movable contact 13c of the data selector 13 is selectively connected to a fixed contact a or a fixed contact b according to whether the field is the field 1 or the field 2 at every four fields.

To be concrete, in the information extraction circuit 29, the reference frame signal RF serving as the timing signal is detected by detecting the "F" from the synchronizing word detected by the SDDI decoder 12 and shown in FIG. 20. This timing signal detected by the header information extraction circuit 29 is supplied to the payload memories 14 and 17 as the reference frame signal RF. In addition, this timing signal is supplied to the control terminal of the data selector 13 as well. On the basis of the reference signal RF, the data selector 13 is controlled so as to change over the first field to the first channel when the "F" of XYZ in the synchronizing word shown in FIG. 20 is "0", and change over the second field to the second channel when the "F" is "1".

In association with the field 1 or the field 2 at every four fields, therefore, the original digital data of the first channel or the original digital data of the second channel is selectively output from the fixed contact a or the fixed contact b of the data selector 9 at changed timing.

In the receiving system of the first channel, the original digital data of the first channel is supplied to the SDDI payload memory 14. In the SDDI payload memory 14, the original digital data of the first channel is stored. At the time of reading, the stored original data of the first channel is divided into the compressed moving picture data, the audio data A1, and the control data C1.

The compressed moving picture data obtained by the division is supplied to the video bit rate reduction decoder 15. In the video bit rate reduction decoder 15, the compressed moving picture data is subjected to expansion processing.

In other words, the video bit rate reduction decoder 15 inversely converts in the inverse DCT circuit the frequency component data subjected to the DCT conversion to time component data, conducts in the inverse quantizing circuit the inverse quantizing calculation and thereby reproducing the high frequency portion of the frequency component removed by the quantizing, and conducts variable length decoding in the VLCD (variable length coding decoding) circuit by using the run length coding and Huffman coding.

The original moving picture data subjected to the expansion processing is supplied to the SDI encoder 16. In the SDI encoder 16, the moving picture data is converted to the format of the SDI scheme and output as the original moving picture data V1 of the first channel. Furthermore, the audio data A1 and the control data C1 obtained by the division are output as they are.

Furthermore, in the receiving system of the second channel, the original data of the second channel is supplied to the SDDI payload memory 17. In the SDDI payload memory 17, the original digital data of the second channel is stored. At the time of reading, the stored original digital data of the second channel is divided into the compressed moving picture data, the audio data A2, and the control data C2.

The compressed moving picture data obtained by the division is supplied to the video bit rate reduction decoder 18. In the video bit rate reduction decoder 18, the moving picture data is subjected to the expansion processing.

In other words, the video bit rate reduction decoder 18 inversely converts in the inverse DCT circuit the frequency component data subjected to the DCT conversion to time component data, conducts in the inverse quantizing circuit the inverse quantizing calculation and thereby reproducing the high frequency portion of the frequency component removed by the quantizing, and conducts variable length decoding in the VLCD (variable length coding decoding) circuit by using the run length coding and Huffman coding.

The original moving picture data subjected to the expansion processing is supplied to the SDI encoder 19. In the SDI encoder 19, the moving picture data is converted to the format of the SDI scheme and output as the original moving picture data V2 of the second channel. Furthermore, the audio data A2 and the control data C2 obtained by the division are output as they are.

In such a two-channel compressed moving picture transmission system in the case of SDDI direct coupling, the moving picture data V1 and the audio data A1 of the first channel are supplied to the sending device of the compressed moving picture transmission system for the first channel forming the first channel transmission system. Further the, moving picture data V2 and the audio data A2 of the second channel are supplied to the sending device of the compressed moving picture transmission system for the second channel forming the second channel transmission system. In the sending device of the compressed moving picture transmission system for the first channel and the sending device of the compressed moving picture transmission system for the second channel, the moving picture data V1 and the moving picture data V2 of the SDI format are subjected to compression processing, and the audio data A1 and the audio data A2 and the moving picture data V1 and the moving picture data V2 subjected to the compression processing are converted to output data so as to be serially arranged on the SDDI format at changed timing, and transmitted serially via one SDDI coaxial cable.

Upon receiving in the receiving device the output data of the SDDI format transmitted from the sending device, the output data arranged on the SDDI format is separated into the first channel and the second channel, and furthermore separated into the compressed moving picture data V1 and the audio data A1 of the first channel and the compressed moving picture data V2 and the audio data A2 of the second channel. In the sending device of the compressed moving picture data transmission system for the first channel forming the first channel receiving system and the sending device of the compressed moving picture data transmission system for the second channel forming the second channel receiving system, the moving picture data V1 and the moving picture data V2 subjected to the compression processing are subjected to expansion processing, and the moving picture data V1 and the moving picture data V2 subjected to the expansion processing are converted inversely to the SDI format. Thus the original moving picture data V1 of the SDI format and audio data A1 of the AES/EBU format of the first channel and the original moving picture data V2 of the SDI format and audio data A2 of the AES/EBU format of the second channel are output.

By thus diverting the conventional single-channel compressed moving picture transmission system and arranging compressed moving picture data of two channels on the SDDI format at timing of the interval of the field 1 or the field 2 at every four fields, the compressed moving picture data of the two channels can be serially transmitted by using one SDDI coaxial cable.

The receiving device of the present embodiment is a receiving device including a plurality of receiving systems, each of the receiving systems including the SDDI decoder 12 serving as serial signal detection means for detecting compressed picture data and a predetermined synchronizing signal from serial signal data obtained by adding the predetermined synchronizing signal to the compressed picture data, and the video bit rate reduction decoders 15 and 18 serving as expansion means for expanding the compressed picture data detected by the serial signal detection means and thereby restoring original picture data, serial signal data of a plurality of channels being received and the original picture data of the plurality of channels being output from the plurality of receiving systems, in which there is provided the data selector 13 serving as changeover means for outputting the compressed picture data output from the serial signal detection means to the receiving system of a certain channel and another receiving system of another channel included in the plurality of receiving systems changed over according to a changeover signal based upon the synchronizing signal, and changeover between the compressed picture data of the certain channel and the compressed picture data of the another receiving system is conducted according to the changeover signal, and thereby original picture data of the certain channel and original picture data of the another channel are output from the receiving system and the another receiving system.

By thus sending out compressed moving picture data of two channels onto the SDDI transmission path at every field, the generally used reference frame signal RF can be utilized as the channel changeover timing signal in a video system such as a video demultiplexer or the like for restoring multiplexed video data to their original state. Therefore, the configuration concerning the channel changeover in the receiving device can be formed simply and easily.

Furthermore, by combining two receiving devices of the existing single-channel compressed moving picture transmission system, the receiving device of the two-channel compressed moving picture transmission system of the present embodiment can be easily implemented.

The configuration concerning the channel changeover becomes simple and low in cost. By incorporating the data selector 13 and the reference frame signal RF of the present embodiment into the receiving device of the single-channel compressed moving picture transmission system beforehand, therefore, it becomes possible to add on the user side one more receiving device of a single-channel compressed moving picture transmission system as occasion demands, combine the two receiving devices, and thereby form the receiving device of the two-channel compressed moving picture transmission system freely.

Furthermore, in the above described receiving device of the present embodiment, the synchronizing signal added to serial signal data has a synchronizing word of "3FF, 000, 000, XYZ" and at least the "F" of the bit B8 of the XYZ indicating the picture field is used as the reference frame signal RF serving as the changeover signal. In addition, the channel of the compressed picture data is detected on the basis of the "F" of the bit B8 indicating the picture field. By using the bit of the synchronizing word of the synchronizing signal of the existing signal format indicating the picture field, therefore, the channel of the compressed picture data can be easily detected according to the distinction of the picture field.

Furthermore, in the above described receiving device of the present embodiment, the synchronizing signal added to serial signal data has a synchronizing word of "3FF, 000, 000, XYZ" and two bits of additional bits B5 to B2 of XYZ are used as the reference frame signal RF serving as the changeover signal. In addition, the channel of the compressed picture data is detected on the basis of the two bits of the additional bits. This results in an effect that each channel of the compressed picture data of four channels corresponding to four fields can be detected by using two bits of additional bits of the synchronizing word of the synchronizing signal of the existing signal format.

Figure 7:
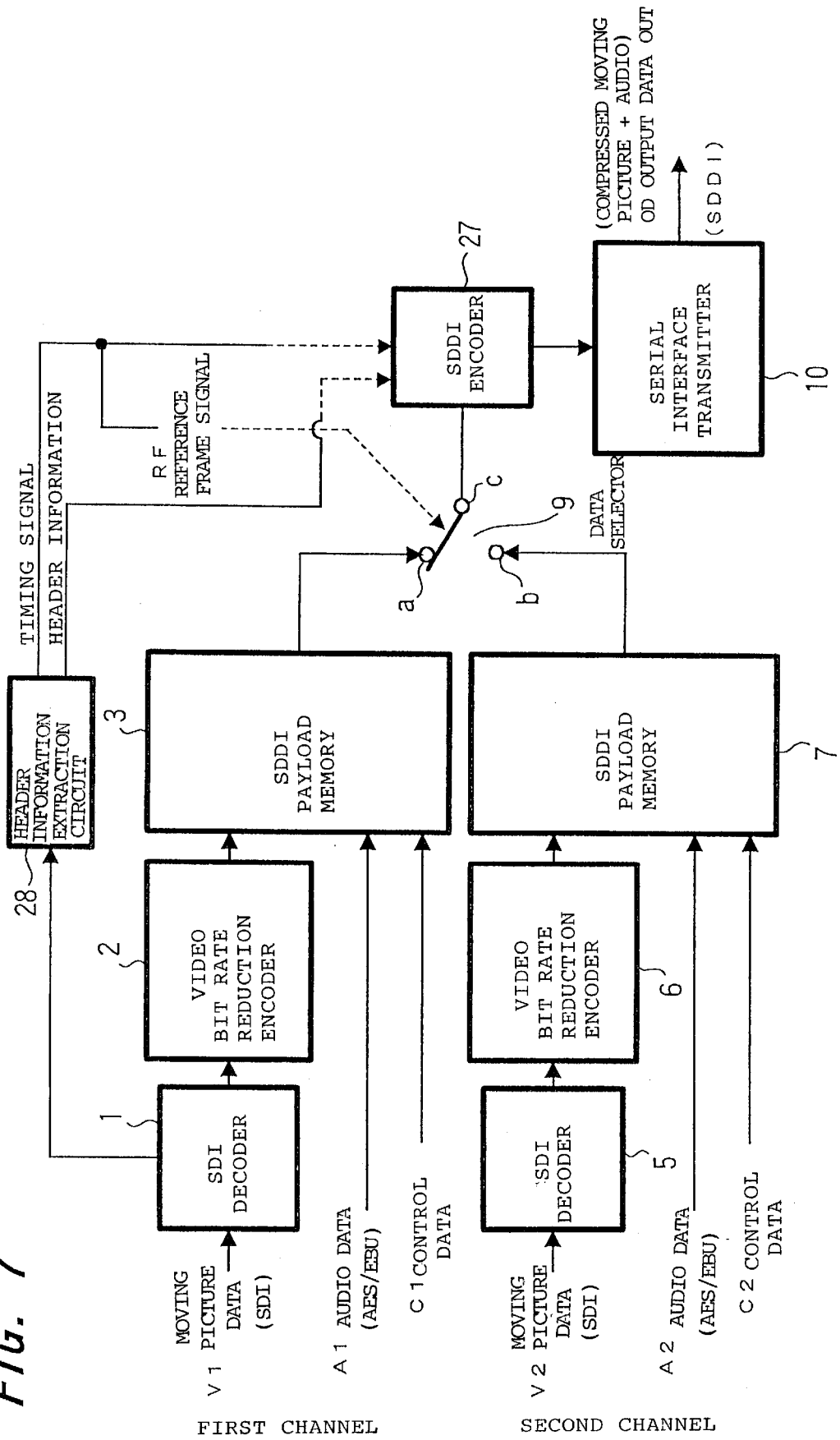
FIG. 7 is a block diagram showing the configuration of a sending device of another two-channel compressed moving picture transmission system of an embodiment of a sending device according to the present invention.

Furthermore, the sending device of the two-channel compressed moving picture transmission system in the case of SDDI direct coupling may be formed as shown in FIG. 7.

As a sending system of a first channel, the sending device includes a SDI decoder 1 for restoring original digital data from moving picture data V1 of the first channel formatted in the SDI scheme, a video bit rate reduction encoder 2 for compressing the digital data to approximately ⅛, and a SDDI payload memory 3 for conducting preprocessing of converting the compressed picture data, audio data A1 of the first channel formatted in the AES/EBU scheme, and control data C1 of the first channel to the format of the SDDI scheme at the time of writing.

Furthermore, as a sending system of a second channel, the sending device includes a SDI decoder 5 for restoring original digital data from moving picture data V2 of the second channel formatted in the SDI scheme, a video bit rate reduction encoder 6 for compressing the digital data to approximately ⅛, and a SDDI payload memory 7 for conducting preprocessing of converting the compressed picture data, audio data A2 of the second channel formatted in the AES/EBU scheme, and control data C2 of the second channel to the format of the SDDI scheme at the time of writing.

Furthermore, the sending device includes a data selector 9 for changing the data supplied from the sending system of the first channel and the data supplied from the sending system of the second channel on the basis of the reference frame signal RF, a SDDI encoder 27 for conducting addition to the data selected by the data selector 9 and thereby generating the original data of the format of the SDDI scheme, and a serial interface transmitter 10 for converting the original data of the first channel and the second channel of the format of the SDDI scheme to a serial form and sending them serially as output data OD.

Furthermore, the sending device has a header information extraction circuit 28 for detecting a reference frame signal RF serving as a timing signal by detecting "F" from a synchronizing word detected by the SDI decoder of the first channel and shown in FIG. 20 and for detecting header information. The timing signal detected by this header information extraction circuit 28 is supplied to the SDDI encoder 27 and a control terminal of the data selector 9 as the reference frame signal RF. On the basis of the reference frame signal RF, the data selector 9 is controlled so as to receive the first channel when the "F" of XYZ in the synchronizing word shown in FIG. 20 is "0", i.e., for a first field, and receive the second channel when the "F" is "1". Furthermore, the header information is supplied to the SDDI encoder 27.

The sending device shown in FIG. 7 differs from the sending device shown in FIG. 4 in that the data selector 9 is disposed immediately after the SDDI payload memory 3 of the sending system of the first channel and the SDDI payload memory 7 of the sending system of the second channel and the SDDI encoder 27 common to the first channel and the second channel is disposed immediately after the data selector 9.

As a result, data of the first channel read out from the SDDI payload memory 3 of the sending system of the first channel is supplied to a stationary contact 9a of the selector 9. Furthermore, data of the second channel read out from the SDDI payload memory 7 of the sending system of the second channel is supplied to a stationary contact 9b of the selector 9. Here, a control terminal of the data selector 9 which is not illustrated is supplied with the reference frame signal RF. On the basis of the reference frame signal RF, therefore, a movable contact 9c of the data selector 9 is selectively changed over and connected to the stationary contact 9a or the stationary contact 9b according to whether the field is the field 1 or the field 2 at every four fields.

Figure 3:
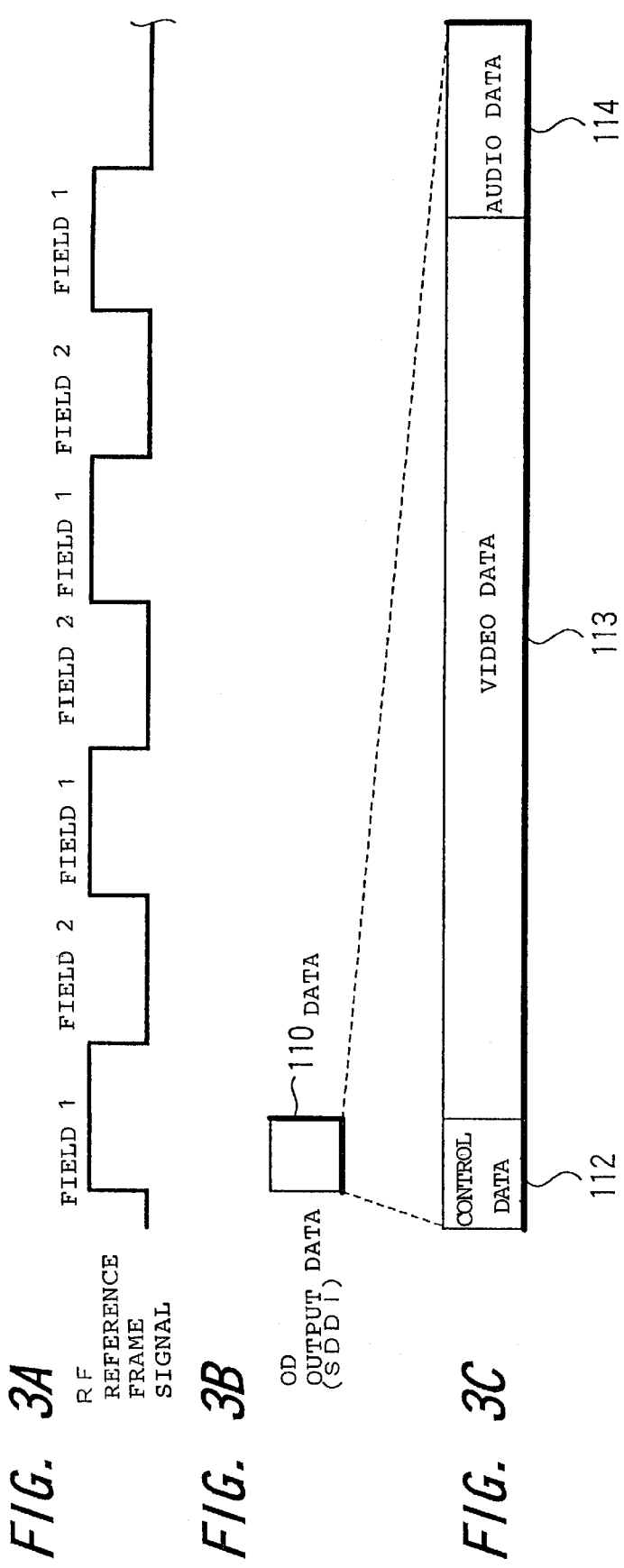

In association with the field 1 or the field 2 at every four fields, therefore, the data of the first channel or the data of the second channel is selectively output from the data selector 9 at changed timing. The data of the first channel and the data of the second channel thus output from the data selector 9 are supplied to the encoder 27. On the basis of the reference frame signal RF shown in FIG. 6A, a header part and the like containing a synchronizing signal which is not illustrated are added to the data of the first channel and the second channel for payload in the field 1 and the field 2 at every four fields. As a result, the original data of the data 21 of the second channel, the data 23 of the second channel and so on of the SDDI format shown in FIG. 3B are generated.

To be concrete, in the header information extraction circuit 28, the reference frame signal RF serving as the timing signal is detected by detecting "F" from a synchronizing word detected by the SDI decoder of the first channel and shown in FIG. 20, and header information is detected. The timing signal detected by this header information extraction circuit 28 is supplied to the SDDI encoder 27 and the control terminal of the data selector 9 as the reference frame signal RF. On the basis of the reference signal RF, the data selector 9 is controlled so as to receive the first channel when the "F" of XYZ in the synchronizing word shown in FIG. 20 is "0", i.e., for a first field, and receive the second channel when the "F" is "1", i.e., for a second field. Furthermore, the header information is supplied to the SDDI encoder 27.

Other configuration and operation are the same as those of FIG. 4, and the description thereof will be omitted.

By thus controlling the output timing of data of each channel and the changeover timing of the data selector 9 on the basis of the reference frame signal synchronized with moving picture data, serial data of the format of the SDDI scheme carrying data of two channels can be sent out.

A sending/receiving device of the present embodiment forming a two-channel compressed moving picture transmission system is a sending/receiving device including a sending unit and a receiving unit, the sending unit including a plurality of sending systems, each of the sending systems including the video bit rate reduction encoders 2 and 6 serving as compression means for compressing picture data, and the SDDI encoders 4 and 8 serving as serial signal generation means for adding a predetermined synchronizing signal to compressed picture data compressed by the compression means and thereby generating predetermined serial signal data, serial signal data of a plurality of channels being sent from the plurality of sending systems, the receiving unit including a plurality of receiving systems, each of the receiving systems including the SDDI decoder 12 serving as serial signal detection means for detecting the compressed picture data and the synchronizing signal from the serial signal data, and the video bit reduction decoders 15 and 18 serving as expansion means for expanding the compressed picture data detected by the serial signal detection means and thereby restoring original picture data, serial signal data of a plurality of channels being received and the original picture data of the plurality of channels being output from the plurality of receiving systems, in which in the sending unit, there is provided the data selector a serving as changeover means for changing over between the serial signal data of a certain channel output from the serial signal generation means of one of the sending systems and the serial signal data of another channel output from the serial signal generation means of another sending system included in the plurality of sending systems by the reference frame signal RF, according to a changeover signal based upon the synchronizing signal, whereby the serial signal data of the certain channel and the serial signal data of the another channel are serially transmitted according to the changeover signal, while in the receiving unit, there is provided the data selector 13 serving as changeover means for outputting the compressed picture data output from the serial signal detection means to the receiving system of a certain channel and another receiving system of another channel included in the plurality of receiving systems changed over according to the reference frame signal RF serving as a changeover signal based upon the synchronizing signal, whereby changeover between the compressed picture data of the certain channel and the compressed picture data of the another receiving system is conducted according to the changeover signal, and original picture data of the certain channel and original picture data of the another channel are output from the receiving system and the another receiving system.

By thus sending out compressed moving picture data of two channels onto the SDDI transmission path at every field, the generally used reference frame signal can be utilized as the channel changeover timing signal in a video system such as a video multiplexer and a video demultiplexer for multiplexing video data on the sending side, transmitting the multiplexed video data, and restoring the multiplexed video data to their original state on the receiving side. Therefore, the configuration concerning the channel changeover in both the sending device and the receiving device can be formed simply and easily. In other words, a two-channel compressed moving picture transmission system can be formed with extreme compactness.

Furthermore, by combining two sending devices of the existing single-channel compressed moving picture transmission system and combining two receiving devices of the existing single-channel compressed moving picture transmission system, the two-channel compressed moving picture transmission system of the present embodiment can be easily implemented.

The configuration concerning the channel changeover becomes simple and low in cost. By incorporating the data selectors 9 and 13 and the reference frame signal RF of the present embodiment into the single-channel compressed moving picture transmission system beforehand, therefore, it becomes possible to add on the user side one more single-channel compressed moving picture transmission system as occasion demands, combine the two single-channel compressed moving picture transmission systems, and thereby form the two-channel compressed moving picture transmission system freely.

Furthermore, a transmission device of this embodiment is a transmission device for transmitting video data of a plurality of channels, in which there are provided compression means for compressing video data of a first channel and video data of a second channel and thereby generating first compressed video data and second compressed video data, conversion means for converting the first compressed video data and the second compressed video data to a predetermined serial transmission format, and transmission control means for controlling transmission timing of first converted compressed video data and second converted compressed video data converted to the predetermined transmission format by the conversion means so as to transmit the first converted compressed video data and the second converted compressed video data by using one serial transmission system. Therefore, it is possible to change over the transmission timing of the compressed moving picture data of two channels and send out the compressed moving picture data of two channels onto the serial transmission path with the predetermined serial transmission format.

Furthermore, a transmission device of this embodiment is a transmission device for transmitting video data of a plurality of channels, in which there are provided compression means for compressing video data of a first channel and video data of a second channel each having a predetermined interval length and thereby generating first compressed video data and second compressed video data, and transmission means for multiplexing and transmitting the first compressed video data and the second compressed video data so as to transmit the first compressed video data and the second compressed video data by using one serial transmission system within the predetermined interval length. Therefore, it is possible to multiplex and send out the compressed moving picture data of two channels onto the serial transmission path.

Furthermore, a transmission method of this embodiment is a transmission method for transmitting video data of a plurality of channels, in which video data of a first channel and video data of a second channel are compressed to thereby generate first compressed video data and second compressed video data, the first compressed video data and the second compressed video data are converted to a predetermined serial transmission format, and transmission timing of the first converted compressed video data and the second converted compressed video data are controlled such that the first converted compressed video data and the second converted compressed video data converted to the predetermined transmission format are transmitted by using one serial transmission system. Therefore, it is possible to change over the transmission timing of the compressed moving picture data of two channels and send out the compressed moving picture data of two channels onto the serial transmission path with a predetermined serial transmission format.

Furthermore, a transmission method of this embodiment is a transmission method for transmitting video data of a plurality of channels, in which video data of a first channel and video data of a second channel each having a predetermined interval length are compressed to thereby generate first compressed video data and second compressed video data, and the first compressed video data and the second compressed video data are multiplexed and transmitted such that the first compressed video data and the second compressed video data are transmitted by using one serial transmission system in the predetermined interval length. Therefore, it is possible to multiplex and send out the compressed moving picture data of two channels onto the serial transmission path.

EFFECTS OF THE INVENTION

The sending device of the present invention is a sending device including a plurality of sending systems, each of the sending systems including compression means for compressing picture data, and serial signal generation means for adding a predetermined synchronizing signal to compressed picture data compressed by the compression means and thereby generating predetermined serial signal data, and serially transmitting serial signal data of a plurality of channels from the plurality of sending systems, in which there is provided the changeover means for changing over between serial signal data of a certain channel output from the serial signal generation means of one of the sending systems and serial signal data of another channel output from the serial signal generation means of another sending system included in the plurality of sending systems, according to a changeover signal based upon the synchronizing signal, and the serial signal data of the certain channel and the serial signal data of the another channel are serially transmitted according to the changeover signal. By thus sending out compressed moving picture data of two channels onto the SDDI transmission path at every field, therefore, the generally used reference frame signal can be utilized as the channel changeover timing signal in a video system such as a video multiplexer or the like for multiplexing video data. This results in an effect that the configuration concerning the channel changeover in the sending device can be formed simply and easily.

Furthermore, there is obtained an effect that the sending device of the two-channel compressed moving picture transmission system of the present embodiment can be easily implemented by combining two sending devices of the existing single-channel compressed moving picture transmission system.

The configuration concerning the channel changeover becomes simple and low in cost. By incorporating the changeover means and the changeover signal of the present invention into the sending device of the single-channel compressed moving picture transmission system beforehand, therefore, it becomes possible to add on the user side one more sending device of a single-channel compressed moving picture transmission system as occasion demands, combine the two sending devices, and thereby form the sending device of the two-channel compressed moving picture transmission system freely.

Furthermore, in the above described sending device of the present invention, the synchronizing signal added to serial signal data has a predetermined synchronizing word and data indicating a picture field detected by the predetermined synchronizing word is used as the changeover signal. This results in an effect that compressed picture data of two channels can be serially disposed so as to correspond to the field 1 or the field 2 included in several compressed fields according to the distinction of the picture field and sent.

Furthermore, in the above described sending device of the present invention, the synchronizing signal added to serial signal data has a predetermined synchronizing word and a plurality of data detected by the predetermined synchronizing word are used as the changeover signal. This results in an effect that every four fields compressed picture data of four channels can be serially disposed so as to respectively correspond to four compressed fields and sent.

Furthermore, in the above described sending device of the present invention, channel identification codes are added to serial signal data. This results in an effect that compressed picture data of a plurality of channels can be serially disposed so as to respectively correspond to several compressed fields according to the distinct-ion of the picture field and transmitted.

A receiving device of the present invention is a receiving device including a plurality of receiving systems, each of the receiving systems including serial signal detection means for detecting compressed picture data and a predetermined synchronizing signal from serial signal data obtained by adding the predetermined synchronizing signal to the compressed picture data, and expansion means for expanding the compressed picture data detected by the serial signal detection means to thereby restore original picture data, and receiving serial signal data of a plurality of channels to thereby output the original picture data of the plurality of channels from the plurality of receiving systems, in which there is provided a changeover means for outputting the compressed picture data output from the serial signal detection means to the receiving system of a certain channel and another receiving system of another channel included in the plurality of receiving systems changed over according to a changeover signal based upon the synchronizing signal, and changeover between the compressed picture data of the certain channel and the compressed picture data of the another receiving system is conducted according to the changeover signal to thereby output original picture data of the certain channel and original picture data of the another channel from the receiving system and the another receiving system. By thus sending out compressed moving picture data of two channels onto the SDDI transmission path at every field, therefore, the generally used reference frame signal RF can be utilized as the channel changeover timing signal in a video system such as a video demultiplexer or the like for restoring multiplexed video data to their original state. This results in an effect that the configuration concerning the channel changeover in the receiving device can be formed simply and easily.

Furthermore, there is obtained an effect that the receiving device of the two-channel compressed moving picture transmission system of the present embodiment can be easily implemented by combining two receiving devices of the existing single-channel compressed moving picture transmission system.

The configuration concerning the channel changeover becomes simple and low in cost. By incorporating the data selector 13 and the reference frame signal RF of the present embodiment into the receiving device of the single-channel compressed moving picture transmission system beforehand, therefore, it becomes possible to add on the user side one more receiving device of a single-channel compressed moving picture transmission system as occasion demands, combine the two receiving devices, and thereby form the receiving device of the two-channel compressed moving picture transmission system freely, resulting in an effect.

Furthermore, in the above described receiving device of the present invention, the synchronizing signal added to serial signal data has a predetermined synchronizing word and data indicating a picture field detected by the predetermined synchronizing word is used as the changeover signal. In addition, the channel of the compressed picture data is detected on the basis of data indicating the picture field. This results in an effect that the channel of the compressed picture data can be easily detected according to the distinction of the picture field by using the data of the synchronizing word of the synchronizing signal of the existing signal format indicating the picture field.

Furthermore, in the above described receiving device of the present invention, the synchronizing signal added to serial signal data has a predetermined synchronizing word and a plurality of data detected by the synchronizing word are used as the changeover signal. In addition, the channel of the compressed picture data is detected on the basis of a plurality of data. This results in an effect that each channel of the compressed picture data of four channels corresponding to four fields can be detected by using a plurality of data of the synchronizing word of the synchronizing signal of the existing signal format.

A sending/receiving device of the present invention is a sending/receiving device including a sending unit and a receiving unit, the sending unit including a plurality of sending systems, each of the sending systems including compression means for compressing picture data, and serial signal generation means for adding a predetermined synchronizing signal to compressed picture data compressed by the compression means to thereby generate predetermined serial signal data, and serially transmitting serial signal data of a plurality of channels from the plurality of sending systems, the receiving unit including a plurality of receiving systems, each of the receiving systems including serial signal detection means for detecting the compressed picture data and the synchronizing signal from the serial signal data, and expansion means for expanding the compressed picture data detected by the serial signal detection means to thereby restore original picture data, and receiving serial signal data of a plurality of channels to thereby output the original picture data of the plurality of channels from the plurality of receiving systems, in which in the sending unit, there is provided changeover means for changing over between the serial signal data of a certain channel output from the serial signal generation means of one of the sending systems and serial signal data of another channel output from the serial signal generation means of another sending system included in the plurality of sending systems, according to a changeover signal based upon the synchronizing signal, and the serial signal data of the certain channel and the serial signal data of the another channel are serially transmitted according to the changeover signal, while in the receiving unit, there is provided changeover means for outputting the compressed picture data output from the serial signal detection means to the receiving system of a certain channel and another receiving system of another channel included in the plurality of receiving systems changed over according to a changeover signal based upon the synchronizing signal, and changeover between the compressed picture data of the certain channel and the compressed picture data of the another receiving system is conducted according to the changeover signal, to thereby output original picture data of the certain channel and original picture data of the another channel from the receiving system and the another receiving system. By thus sending out compressed moving picture data of two channels onto the SDDI transmission path at every field, therefore, the generally used reference frame signal can be utilized as the channel changeover timing signal in a video system such as a video multiplexer and a video demultiplexer or the like for multiplexing video data on the sending side, transmitting the multiplexed video data, and restoring the multiplexed video data to their original state on the receiving side. Therefore, the configuration concerning the channel changeover in both the sending device and the receiving device can be formed simply and easily. In other words, there is obtained an effect that a two-channel compressed moving picture transmission system can be formed with extreme compactness.

Furthermore, this results in an effect that the two-channel compressed moving picture transmission system of the present embodiment can be easily implemented by combining two sending devices of the existing single-channel compressed moving picture transmission system and combining two receiving devices of the existing single-channel compressed moving picture transmission system.

The configuration concerning the channel changeover becomes simple and low in cost. By incorporating the data selectors 9 and 13 and the reference frame signal RF of the present embodiment into the single-channel compressed moving picture transmission system beforehand, therefore, it becomes possible to add on the user side one more single-channel compressed moving picture transmission system as occasion demands, combine the two single-channel compressed moving picture transmission systems to thereby form the two-channel compressed moving picture transmission system freely, resulting in an effect.

Furthermore, a transmission device of the present invention is a transmission device for transmitting video data of a plurality of channels, in which there are provided compression means for compressing video data of a first channel and video data of a second channel to thereby generate first compressed video data and second compressed video data, conversion means for converting the first compressed video data and the second compressed video data to a predetermined serial transmission format, and transmission control means for controlling transmission timing of first converted compressed video data and second converted compressed video data such that the first converted compressed video data and the second converted compressed video data converted to the predetermined transmission format by the conversion means are transmitted by using one serial transmission system. This results in an effect that it is possible to change over the transmission timing of the compressed moving picture data of two channels and send out the compressed moving picture data of two channels onto the serial transmission path with a predetermined serial transmission format.

Furthermore, a transmission device of the present invention is a transmission device for transmitting video data of a plurality of channels, in which there are provided compression means for compressing video data of a first channel and video data of a second channel each having a predetermined interval length to thereby generate first compressed video data and second compressed video data, and transmission means for multiplexing and transmitting the first compressed video data and the second compressed video data such that the first compressed video data and the second compressed video data are transmitted by using one serial transmission system within the predetermined interval length. This results in an effect that it is possible to multiplex and send out the compressed moving picture data of two channels onto the serial transmission path.

Furthermore, a transmission method of the present invention is a transmission method for transmitting video data of a plurality of channels, in which video data of a first channel and video data of a second channel are compressed to thereby generate first compressed video data and second compressed video data, the first compressed video data and the second compressed video data are converted to a predetermined serial transmission format, and transmission timing of first converted compressed video data and second converted compressed video data are controlled such that the first converted compressed video data and the second converted compressed video data converted to the predetermined transmission format by using one serial transmission system. This results in an effect that it is possible to change over the transmission timing of the compressed moving picture data of two channels and send out the compressed moving picture data of two channels on to the serial transmission path with a predetermined serial transmission format.

Furthermore, a transmission method of the present invention is a transmission method for transmitting video data of a plurality of channels, in which video data of a first channel and video data of a second channel each having a predetermined interval length are compressed to thereby generate first compressed video data and second compressed video data, and the first compressed video data and the second compressed video data are multiplexed and transmitted such that the first compressed video data and the second compressed video data are transmitted by using one serial transmission system within the predetermined interval length. This results in an effect that it is possible to multiplex and send out the compressed moving picture data of two channels onto the serial transmission path.

INDUSTRIAL APPLICABILITY

The present invention can be used for a SDDI direct-coupled two-channel compressed moving picture transmission system and a relaying two-channel compressed moving picture transmission system using a satellite circuit and a high speed telephone circuit.

Description of Reference Numerals

1: SDI decoder
2: Video bit rate reduction encoder
3: SDDI payload memory
4: SDDI encoder
5: SDI decoder
6: Video bit rate reduction encoder
7: SDDI payload memory
8: SDDI encoder
9: Data selector
10: Serial interface transmitter
11: Serial interface receiver
12: SDDI decoder
13: Data selector
14: SDDI payload memory
15: Video bit rate reduction decoder
16: SDI encoder
17: SDDI payload memory
18: Video bit rate reduction decoder
19: SDI encoder
20: Data of first channel
21: Data of second channel
22: Data of first channel
23: Data of second channel
24: Control data
25: Video data
26: Audio data
27: SDDI encoder
28: Header information extraction circuit
29: Header information extraction circuit
30: Sending device
31: SDDI coaxial cable
32: Receiving device
33: SDDI protocol conversion device
34: Satellite circuit
35: High speed telephone circuit
36: SDDI protocol inverse conversion device
V1: Moving picture data
A1: Audio data
C1: Control data
V2: Moving picture data
A2: Audio data
C2: Control data
OD: Output data
RF: Reference frame signal

What is claimed is:

1. In a sending device comprising a plurality of sending systems, each of the sending systems including:
compressing means for compressing picture data; and
serial signal generation means for adding a predetermined synchronizing signal to compressed picture data compressed by said compression means to thereby generate predetermined serial signal data, and
transmitting serial signal data of a plurality of channels from said plurality of sending systems,
the transmitting apparatus being characterized in that
there is provided a changeover means for changing over between the serial signal data of a certain channel output from said serial signal generation means of said sending systems and serial signal data of another channel output from the serial signal generation means of another sending system of said plurality of sending systems, according to a changeover signal based upon said synchronizing signal, and the serial signal data of said certain channel and the serial signal data of said another channel are serially transmitted according to said changeover signal;

whereby said synchronizing signal is part of a packet that includes video data corresponding to said plurality of channels, said synchronizing signal being included in an ancillary data portion of said packet separate from any video data and audio data.

2. In a sending device according to claim 1,
the transmitting apparatus being characterized in that
said synchronizing signal added to said serial signal data includes a predetermined synchronizing word, and data indicating a picture field detected by said predetermined synchronizing word is used as said changeover signal.

3. In a sending device according to claim 1,
the transmitting apparatus being characterized in that said synchronizing signal added to said serial signal data includes a predetermined synchronizing word, and a plurality of data detected by said predetermined synchronizing word are used as said changeover signal.

4. In a sending device according to claim 1,
the transmitting apparatus being characterized in that a channel identification code is added to said serial signal data.

5. In a receiving device including a plurality of receiving systems, each of the receiving systems including:
serial signal detection means for detecting, from serial signal data obtained by adding a predetermined synchronizing signal to compressed picture data, said compressed picture data and said predetermined synchronizing signal; and expansion means for expanding said compressed picture data detected by said serial signal detection means to thereby restore original picture data, and receiving serial signal data of a plurality of channels to thereby output said original picture data of the plurality of channels from said plurality of receiving systems, the receiving apparatus being characterized in that there is provided a changeover means for outputting said compressed picture data output from said serial signal detection means to said receiving system of a certain channel and another receiving system of another channel included in said plurality of receiving systems changed over according to a changeover signal based upon said synchronizing signal, and changeover between the compressed picture data of said certain channel and the compressed picture data of said another channel is conducted according to said changeover signal to thereby output original picture data of said certain channel and original picture data of said another channel from said receiving system and said another receiving system;

whereby said synchronizing signal is part of a packet that includes video data corresponding to said plurality of channels, said synchronizing signal being included in an ancillary data portion of said packet separate from any video data and audio data.

6. In a receiving device according to claim 5,
the receiving apparatus being characterized in that
said synchronizing signal added to said serial signal data includes a predetermined synchronizing word, and data indicating a picture field detected by said predetermined synchronizing word is used as said changeover signal, and a channel of said compressed picture data is detected on the basis of said data indicating the picture field.

7. In a receiving device according to claim 5,
the receiving apparatus being characterized in that
said synchronizing signal added to said serial signal data includes a predetermined synchronizing word, and a plurality of data detected by said predetermined synchronizing word are used as said changeover signal, and the channel of said compressed picture data is detected on the basis of said plurality of data.

8. In a sending/receiving device comprising a sending unit including a plurality of sending systems, each of the sending systems having:
compression means for compressing picture data; and
serial signal generation means for adding a predetermined synchronizing signal to compressed picture data compressed by said compression means to thereby generate predetermined serial signal data, and transmitting serial signal data of a plurality of channels from said plurality of sending systems, a receiving unit including a plurality of receiving systems, each of the receiving systems including
serial signal detection means for detecting said compressed picture data and said synchronizing signal from said serial signal data; and expansion means for expanding said compressed picture data detected by said serial signal detection means to thereby restore original picture data, receiving serial signal data of a plurality of channels to thereby output original picture data of the plurality of channels from said plurality of receiving systems, the transmitting receiving apparatus being characterized in that in said sending unit, there is provided a changeover means for changing over between the serial signal data of a certain channel output from said serial signal generation means of said sending systems and serial signal data of another channel output from the serial signal generation means of another sending system included in said plurality of sending systems, according to a changeover signal based upon said synchronizing signal, and the serial signal data of said certain channel and the serial signal data of said another channel are serially transmitted according to said changeover signal, and in said receiving unit,
there is provide a changeover means for outputting said compressed picture data output from said serial signal detection means to said receiving system of a certain channel and another receiving system of another channel included in said plurality of receiving systems changed over according to a changeover signal based upon said synchronizing signal, and changeover between the compressed picture data of said certain channel and the compressed picture data of said another channel is conducted according to said changeover signal to thereby output original picture data of said certain channel and original picture data of said another channel from said receiving system and said another receiving system;

whereby said synchronizing signal is part of a packet that includes video data corresponding to said plurality of channels, said synchronizing signal being included in an ancillary data portion of said packet separate from any video data and audio data.

9. In a transmission device for transmitting video data of a plurality of channels, the transmission apparatus, comprising:

compression means for compressing video data of a first channel and video data of a second channel to thereby generate a first compressed video data and a second compressed video data;

conversion means for converting said first compressed video data and said second compressed video data to a predetermined serial transmission format; and transmission control means for controlling transmission timing of the first converted compressed video data and the second converted compressed video data such that said first converted compressed video data and said second converted compressed video data converted to the predetermined transmission format by said conversion means are transmitted by using one serial transmission system;

whereby a synchronization signal is provided for switching among data corresponding to said plurality of channels; and whereby said synchronizing signal is part of a packet that includes video data corresponding to said plurality of channels, said synchronizing signal being included in an ancillary data portion of said packet separate from any video data and audio data.

10. In a transmission device according to claim 9, the transmission apparatus being characterized in that there is further provided timing signal extraction means for extracting a timing signal given to the video data of said first channel, and said transmission control means controls the transmission timing of said first converted compressed video data and said second converted compressed video data on the basis of said timing signal.

11. In a transmission device according to claim 9, the transmitting apparatus being characterized in that said timing signal extraction means recognizes a recording position of said timing signal by detecting a synchronizing word given as header information of the video data of said first channel.

12. In a transmission device according to claim 11, the transmitting apparatus being characterized in-that said timing signal is a reference frame signal.

13. In a transmission device according to claim 11, the transmitting apparatus being characterized in that said synchronizing word is formed by a bit pattern which is not present in said video data.

14. In a transmission device according to claim 9, the transmitting apparatus being characterized in that a compression scheme of said compression means includes compressing said video data at every one GOP, and said control means repeats transmission of said first converted compressed video data transmitting of and said second converted compressed video data by taking an interval corresponding to said one GOP as one sequence.

15. In a transmission device for transmitting video data of a plurality of channels, the transmission apparatus comprising:

compression means for compressing video data of a first channel and video data of a second channel each having a predetermined interval length to thereby generate a first compressed video data and a second compressed video data; and transmission means for multiplexing and transmitting said first compressed video data and said second compressed video data such that said first compressed video data and said second compressed video data are transmitted by using one serial transmission system within said respective predetermined interval lengths;

whereby a synchronization signal is provided for switching among data corresponding to said plurality of channels; and whereby said synchronizing signal is part of a packet that includes video data corresponding to said plurality of channels, said synchronizing signal being included in an ancillary data portion of said packet separate from any video data and audio data.

16. In a transmission device according to claim 15, the transmission apparatus being characterized in that said predetermined interval length is an interval length corresponding to a compression unit of said compression means.

17. In a transmission method for transmitting video data of a plurality of channels, the transmission method being characterized in that video data of a first channel and video data of a second channel are compressed to thereby generate a first compressed video data and a second compressed video data;

said first compressed video data and said second compressed video data are converted to a predetermined serial transmission format; and transmission timing of said first converted compressed video data and said second converted compressed video data are controlled such that said first converted compressed video data and said second converted compressed video data converted to the predetermined transmission format are transmitted by using one serial transmission system;

whereby a synchronization signal is provided for switching among data corresponding to said plurality of channels; and whereby said synchronizing signal is part of a packet that includes video data corresponding to said plurality of channels, said synchronizing signal being included in an ancillary data portion of said packet separate from any video data and audio data.

18. In a transmission method according to claim 17, the transmission method being characterized in that a timing signal given to the video data of said first channel is extracted, and the transmission timing of said first converted compressed video data and said second converted compressed video data is controlled on the basis of said timing signal.

19. In a transmission method according to claim 18, the transmission method being characterized in that a recording position of said timing signal is detected by means of a synchronizing word given as a header information of the video data of said first channel.

20. In a transmission method according to claim 17, the transmission method being characterized in that the video data of said first channel and said second channel are compressed by taking one GOP as a unit of compression processing, and transmission of said first converted compressed video data and transmission of said second converted compressed video data are repeated by taking an interval corresponding to one GOP as one sequence.

21. In a transmission method for transmitting video data of a plurality of channels, the transmission method being characterized in that video data of a first channel and video data of a second channel each having a predetermined interval length are compressed to thereby generate a first compressed video data and second compressed video data; and said first compressed video data and said second compressed video data are multiplexed and compressed such that said first compressed video data and said second compressed video data are transmitted within said respective predetermined interval lengths by using one serial transmission system;

whereby a synchronization signal is provided for switching among data corresponding to said plurality of channels; and whereby said synchronizing signal is part of a packet that includes video data corresponding to said plurality of channels, said synchronizing signal being included in an ancillary data portion of said packet separate from any video data and audio data.

22. In a transmission method according to claim 21, the transmission method being characterized in that said predetermined interval length is an interval length corresponding to a compression unit used when compressing the video data of said first channel and said second channel.

* * * * *